US010282687B2

(12) United States Patent
Parvania

(10) Patent No.: US 10,282,687 B2
(45) Date of Patent: May 7, 2019

(54) SYSTEMS AND METHODS FOR MANAGING POWER GENERATION RESOURCES

(71) Applicant: University of Utah Research Foundation, Salt Lake City, UT (US)

(72) Inventor: Masood Parvania, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 57 days.

(21) Appl. No.: 15/396,363

(22) Filed: Dec. 30, 2016

(65) Prior Publication Data

US 2017/0109674 A1 Apr. 20, 2017

Related U.S. Application Data

(63) Continuation-in-part of application No. 15/289,121, filed on Oct. 7, 2016.

(60) Provisional application No. 62/387,664, filed on Dec. 30, 2015, provisional application No. 62/284,765, (Continued)

(51) Int. Cl.

| | |
|---|---|
| ***G06Q 10/00*** | (2012.01) |
| ***G06Q 10/06*** | (2012.01) |
| ***G06Q 50/06*** | (2012.01) |
| ***G05F 1/66*** | (2006.01) |

(Continued)

(52) U.S. Cl.

CPC ......... *G06Q 10/06314* (2013.01); *G05F 1/66* (2013.01); *G06Q 10/06312* (2013.01); *G06Q 50/06* (2013.01); *H02J 3/008* (2013.01); *H02J 3/32* (2013.01); *H02J 2003/007* (2013.01); *Y02E 40/76* (2013.01); *Y02E 60/76* (2013.01); *Y02P 90/82* (2015.11); *Y04S 10/54* (2013.01); *Y04S 10/545* (2013.01); *Y04S 40/22* (2013.01); *Y04S 50/10* (2013.01)

(58) Field of Classification Search

CPC ....... G06Q 10/06314; G06Q 10/06312; G06Q 50/06

See application file for complete search history.

(56) References Cited

U.S. PATENT DOCUMENTS

| | | | |
|---|---|---|---|
| 7,343,360 | B1 | 3/2008 | Ristanovic et al. |
| 8,639,392 | B2 | 1/2014 | Chassin |
| 8,862,279 | B2 | 10/2014 | Darden, II et al. |

(Continued)

OTHER PUBLICATIONS

B.R. Mehta and Y. Jaganmohan Reddy, Industrial Process Automation Systems, Butterworth-Heinemann, Nov. 26, 2014.*

(Continued)

*Primary Examiner* — Christopher E. Everett

(74) *Attorney, Agent, or Firm* — Workman Nydegger

(57) ABSTRACT

An optimal operating configuration for a power system may be derived from a continuous-time model of generation and ramping constraints of power generation units available within the power system. The optimal operating configuration may be leveraged to calculate a valuation metric for power generated by the power generating units. The valuation metric may include costs incurred by the power generating units due to ramping events. In addition, incremental generation and ramping cost metrics may be used to identify power generation units to use in responding to short-term load variations. Power generating units may be selected based, at least in part, on the incremental ramping costs of the power generating units.

19 Claims, 10 Drawing Sheets

Related U.S. Application Data filed on Oct. 8, 2015, provisional application No. 62/284,756, filed on Oct. 7, 2015.

(51) Int. Cl.
*H02J 3/00* (2006.01)
*H02J 3/32* (2006.01)

(56) References Cited

U.S. PATENT DOCUMENTS 8,886,362 B2 11/2014 Krok et al.
8,938,320 B2 1/2015 Ooba et al.
9,020,649 B2 4/2015 Sharma et al.
9,159,042 B2 10/2015 Steven et al.
9,300,141 B2 3/2016 Marhoefer
9,312,698 B2 4/2016 Subbotin et al.
9,367,825 B2 6/2016 Steven et al.
9,395,741 B2 7/2016 Shiga et al.
9,509,176 B2 11/2016 Carter et al.
2002/0165816 A1 11/2002 Barz
2004/0181460 A1 9/2004 Bjelogrlic et al.
2004/0215529 A1 10/2004 Foster et al.
2004/0260489 A1* 12/2004 Mansingh .............. G06Q 50/06 702/60
2004/0267404 A1* 12/2004 Danko ................... B25J 9/1607 700/245
2005/0165948 A1 7/2005 Hatime
2005/0285574 A1* 12/2005 Huff ....................... G06Q 10/04 322/24
2007/0244604 A1* 10/2007 McNally ................ G06Q 50/06 700/291
2009/0062969 A1 3/2009 Chandra et al.
2009/0281876 A1 11/2009 Bullinger et al.
2011/0029141 A1* 2/2011 Sun .......................... H02J 3/00 700/291
2011/0035071 A1 2/2011 Sun et al.
2011/0066391 A1* 3/2011 AbuAli .................. G06Q 10/06 702/61
2011/0071690 A1 3/2011 Sun et al.
2011/0213739 A1* 9/2011 Benitez .................. G01D 4/004 706/12
2012/0101639 A1* 4/2012 Carralero .................. G06F 1/26 700/286
2012/0253532 A1 10/2012 McMullin et al.
2013/0006439 A1* 1/2013 Selvaraj ................. G06Q 10/06 700/297
2013/0190938 A1 7/2013 Zadeh et al.
2014/0005852 A1 1/2014 Asghari et al.
2014/0039710 A1 2/2014 Carter et al.
2014/0277797 A1 9/2014 Mokhtari et al.
2015/0051746 A1* 2/2015 Mathiesen ................ H02J 3/14 700/291
2015/0057821 A1* 2/2015 Nasle ..................... G06Q 10/04 700/291
2015/0127425 A1 5/2015 Greene et al.
2015/0192697 A1* 7/2015 Hosking ................. G01W 1/10 702/3
2015/0206083 A1 7/2015 Chen et al.
2015/0316907 A1* 11/2015 Elbsat .................... G06Q 10/04 700/275
2017/0102725 A1 4/2017 Parvania
2018/0217568 A1 8/2018 Parvania

OTHER PUBLICATIONS

C. Wang and S. M. Shahidehpour, “Effects of ramp-rate limits on unit commitment and economic dispatch,” in IEEE Transactions on Power Systems, vol. 8, No. 3, pp. 1341-1350, Aug. 1993.*
C. Wang and S. M. Shahidehpour, “Optimal generation scheduling with ramping costs,” Conference Proceedings Power Industry Computer Application Conference, Scottsdale, AZ, 1993, pp. 11-17.*
Uplift in RTO and ISO Markets, FERC—Federal Energy Regulatory Commission, Staff Analysis of Uplift in RTO and ISO Markets, Aug. 2014, 46 pages.
Auroraxmp, et al., AURORAxmp Comprehensive Power Forecasting, The World Standard for Power Market Simulation, Forecasting and Analysis, brochure, 12 pages.
Parvania, et al., Continuous-Time Marginal Pricing of Electricity, IEE Transactions on Power Systems, 2016, 10 pages http://dx.doi.org/10.1109/TPWRS.2016.2597288.
Parvania, et al., Generation Ramping Valuation in Day-Ahead Electricity Markets, 2016 49th Hawaii International Conference on System Sciences, doi 10/1109/HICSS.2016.292, pp. 2335-2344.
Harvey, et al., Forecasting Hourly Electricity Demand Using Time-Varying Splines, Journal of the American Statistical Association, Dec. 1993, 88, 424; ProQuest p. 1228-1236.
Parvania, et al., Office Action dated Jun. 26, 2018 for U.S. Appl. No. 15/289,121.
U.S. Appl. No. 15/289,121 dated Jan. 24, 2019 Notice of Allowance.

* cited by examiner

SYSTEMS AND METHODS FOR MANAGING POWER GENERATION RESOURCES

CROSS-REFERENCE TO RELATED APPLICATIONS

This application claims priority to U.S. Provisional Patent Application No. 62/387,664 filed Dec. 30, 2015. This application also claims priority to U.S. patent application Ser. No. 15/289,121 filed Oct. 7, 20156, and which claims priority to U.S. Provisional Patent Application No. 62/284,756 filed Oct. 7, 2015, and to U.S. Provisional Patent Application No. 62/284,765 filed Oct. 8, 2015, each of which is hereby incorporated by reference in its entirety.

STATEMENT REGARDING FEDERALLY SPONSORED RESEARCH OR DEVELOPMENT

This invention was made with government support under Grant Number 1549924 awarded by the National Science Foundation. The government has certain rights in the invention.

TECHNICAL FIELD

This disclosure relates to systems and methods for quantifying a marginal cost metric for power generation and, in particular, to quantifying costs related to ramping power generating units.

BACKGROUND

Discrete-time demand models for power system management may not accurately reflect continuous-time variations in net load and/or power generation and ramping characteristics. Similarly, valuation metrics derived from such models may not adequately compensate for costs associated with ramping. These deficiencies may decrease the accuracy in quantifying the value of power generation resources, which may result in sub optimal power system operation, the need for uplift in order for certain power generators to remain solvent, and so on.

SUMMARY

Disclosed herein are systems and methods for managing a power system. The disclosed systems and methods may comprise determining a net load forecast for a power system, the net load forecast corresponding to a sequence of net load samples, each net load sample defining a linear net load on the power system during a respective time interval within an operating period of the power system, wherein determining the net load forecast further comprises modeling a non-linear variance of the net load on the power system within one or more time intervals of the net load samples. The sequence of net load samples may comprise an hourly day-ahead load forecast for the power system.

In some embodiments, the disclosed systems and methods further comprise formulating a generation trajectory to configure one or more power generation units to satisfy the determined net load forecast for the power system, including the non-linear variance of the net load modeled within the one or more time intervals, and configuring the one or more power generators to generate power in accordance with the determined power generation trajectory during the operating period. In some embodiments, the disclosed systems and methods further comprise configuring transmission infrastructure of the power system to accept power generated by the one or more power generators during the operating period by, inter alia, configuring the one or more power generators to generate power for the power system according to one or more of: a specified generation trajectory and specified ramping trajectory. The disclosed systems and methods may be configured to model the non-linear variance of the net load by projecting the net load samples into a cubic spline function space. In some embodiments, formulating the generation trajectory comprises projecting generation trajectories of each of a plurality of power generation units into the cubic spline function space. The disclosed systems and methods may further comprise determining an optimal solution to the unit commitment model, wherein the optimal solution to the unit commitment model determines generation trajectory of the one or more power generation units.

DETAILED DESCRIPTION OF PREFERRED EMBODIMENTS

Figure 1:
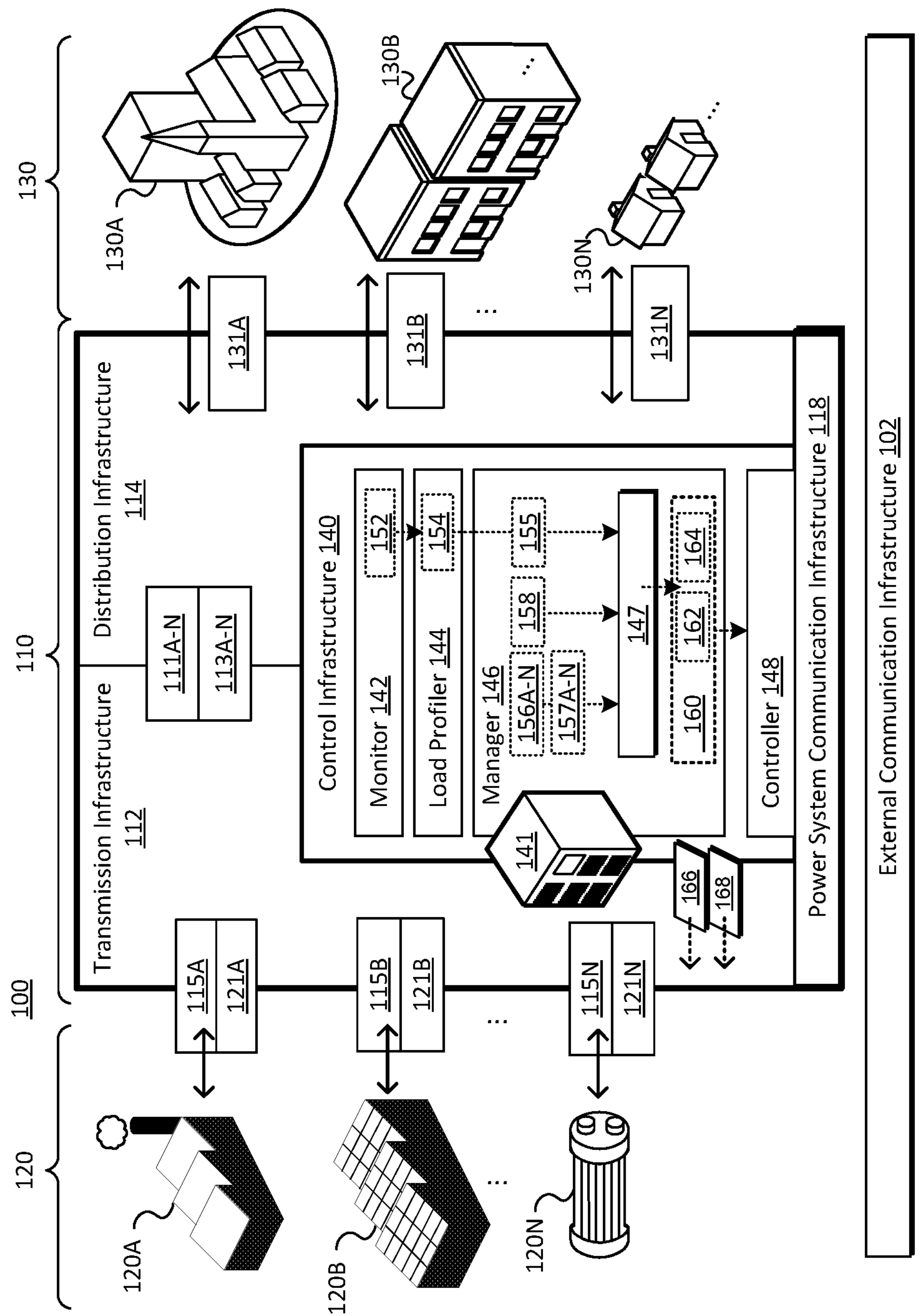
FIG. 1 is a schematic block diagram of one embodiment of a power system comprising a controller configured to manage power generation resources.

Disclosed herein are embodiments of systems and methods for managing a power system. A power system may be configured to distribute power to a load. The load may consume electrical power distributed thereto through distribution infrastructure of the power system. The load may comprise any entity configured to consume electrical power including, but not limited to: homes, businesses, factories, power storage systems, and the like.

The power system may be configured to acquire electrical power for distribution to the load from one or more power generating units. As used herein, a power generating unit (PGU) refers to any entity capable of providing electrical power to the power system. A PGU may include, but is not limited to: a fossil-fuel power generator (e.g., a natural gas generator, a coal-fired power plant, or the like), a renewable energy power generator (e.g., a hydroelectric generator, a solar power generator, a wind power generator, or the like), a nuclear power generator, a power storage system (e.g., a battery storage system), and/or the like. The power system may be capable of being electrically coupled to a plurality of different PGUs. Each PGU may be capable of being electrically coupled to the power system at respective locations (e.g., bus locations within power transmission infrastructure of the power system). Moreover, each PGU may have respective power generation characteristics. As used herein, a "characteristic" of a PGU may refer to any aspect of power generated by the PGU including, but not limited to: a maximum amount of power capable of being produced by the PGU at a given time and/or under given conditions (e.g., $P_{MAX}(t, c)$ where t is time and c is particular operating conditions); a minimum amount of power that can be provisioned from the PGU at a given time and/or under given conditions (e.g., $P_{MIN}(t, c)$); ramping trajectory characteristics that define, inter alia, the rate at which the PGU can ramp up power production to the power system as a function of time, under given operating conditions (e.g., from $R_{MAX}$ (t, c) to $R_{MIN}$); location characteristics corresponding to the location(s) at which the PGU can be electrically coupled to the power system (e.g., bus locations at which the PGU is capable of being electrically coupled to transmission infrastructure of the power system); cost characteristics determining a cost for power provided by the PGU as a function of time and/or at given operating conditions (e.g., overall demand); and so on.

The power system may be configured to provision electrical power to satisfy discrete and/or piecewise linear net load forecast values (e.g., according to a Unit Commitment (UC) model). The power system may be configured to determine an estimate of power resources required to satisfy the load on the power system over a particular time period (e.g., the next day). The UC model may be used to determine an "optimal" configuration of PGUs to provide power to satisfy net load requirements on an hourly basis. The optimal configuration may be based on characteristics of the PGU, operating constraints of the PGU, and constraints of the power system (e.g., transmission constraints, power flow constraints, and so on). A day-ahead UC model for a power system may be implemented as an instance of mixed-integer linear programming (MILP) in which the generation cost function (constraints of the PGU) and other operating constraints are modeled and from which an "optimal" configuration of PGUs for the power system is derived. An "optimal" configuration may comprise scheduling a PGU to provide power to the power system during the particular time period (e.g., during the next day). The "optimal solution" may, therefore, comprise determining hourly decision variables for each PGU that define how the PGU is to be used to satisfy the demand on the power system during real-time operation. The hourly decision variable for a PGU may include an hourly commitment schedule for the PGU, an hourly generation schedule for the PGU, and so on. The power system may use the "optimal solution" for the day-ahead UC for real-time operation of the power system over the particular time period (e.g., during the next day).

The actual load on the power system may deviate from the day-ahead UC model, which may result in scarcity conditions (e.g., conditions in which the power system has insufficient capacity to satisfy demand). Scarcity conditions may be caused by defects in the UC model itself and, in particular, inaccuracies in modeling net load on the power system, generation trajectory, and so on.

Disclosed herein are embodiments of power system controller infrastructure 140 configured to determine a configuration for the power system adapted to avoid scarcity events by, inter alia, modeling ramping events and/or ramping constraints of the PGU available to the power system. The power system controller may be configured to determine a load profile approximation for the power system in which PGU ramping events and constraints are modeled in inter-temporal, continuous-time. The power system controller may determine an "optimal" configuration for the power system based on continuous-time load profile approximations of the PGU, and may use the determined configuration for real-time operation of the power system.

FIG. 1 is a schematic diagram of one embodiment of a power system 100. The power system 100 may comprise power system infrastructure 110. The power system infrastructure 110 may comprise a configurable network or grid for the transmission and distribution of electrical power. The power system infrastructure 110 may comprise transmission infrastructure 112 configured to transfer electrical power from one or more power generating units (PGUs) 120 into the power system 100 and distribution infrastructure 114 to distribute electrical power to a load 130. The power system infrastructure 110 may comprise hardware components configured to transmit and/or distribute electrical power, which may include, but are not limited to: transmission lines (e.g., low-voltage power lines, high-voltage power lines, extra high-voltage power lines, three-phase transmission lines, etc.), transformers, substations, switches, buses, bus bars, power conditioners, and/or the like.

The power system infrastructure 110 may comprise power system communication infrastructure 118, which may be configured to communicatively couple monitoring and/or control computing devices (MCCDs) of the power system 100. As used herein, an MCCD refers to a computing device configured for use within the power system infrastructure 110. An MCCD may be a computing device comprising processing resources, memory resources, non-transitory storage resources, communication resources (e.g., interfaces to communicatively couple the MCCD to one or more electronic communication networks), human-machine interface (HMI) components, and/or the like. The processing resources of an MCCD may comprise one or more general purpose processors, one or more special purpose processors (e.g., monitoring and/or communications processors), programmable logic (e.g., a field-programmable gate array), and/or the like. The memory resources of an MCCD may comprise volatile memory, firmware, and/or the like. The non-transitory storage resources of an MCCD may comprise one or more storage devices configured to store data on a non-transitory storage media, such as a hard disk, solid-state storage (flash memory storage), battery-backed memory, and/or the like. The communication resources of an MCCD may comprise one or more network interfaces configured to communicatively couple the MCCD to one or more electronic communication networks of one or more of the power system communication infrastructure 118, an external communication infrastructure 102, and/or the like. The power system communication infrastructure 118 may comprise any suitable electronic networking infrastructure including, but not limited to: an electronic communication network, a private electronic communication network, a local area network, a wide-area network, a wireless network, a cellular data network, a wide area control system (WACS), a Supervisory Control and Data Acquisition (SCADA) system, and/or the like. Portions of the power system communication infrastructure 118 and/or computing devices deployed within the power system infrastructure 110 may be communicatively coupled to an external communication infrastructure 102, which may comprise one or more public and/or private electronic communication networks, such as the Internet, a private network of one or more of the PGUs 120A-N, and/or the like.

The power system infrastructure 110 may further comprise control infrastructure 140, which may be configured to monitor, manage, and/or configure the power system 100. The control infrastructure 140 may comprise a power system monitor 142 (or monitor 142), a load profiler 144, a power system configuration manager 146 (or manager 146), and controller 148, which are described in further detail herein.

The control infrastructure 140 may comprise hardware components, such as a computing device 141. The computing device 141 may comprise an MCCD, as disclosed herein. The computing device 141 may comprise processing resources, memory resources, non-transitory storage resources, HMI components, communication resources, and/or the like. The individual components of the computing device 141 are not depicted in FIG. 1 to avoid obscuring details of the disclosed embodiments. The computing device 141 may be communicatively coupled to the power system communication infrastructure 118 and/or the external communication infrastructure 102.

Portions of the control infrastructure 140 (e.g., portions of the monitor 142, load profiler 144, manager 146, controller 148, and so on) may be embodied as computer-readable instructions stored on non-transitory storage resources of the computing device 141. The instructions may be configured to cause the computing device 141 to perform operations and/or processing steps for monitoring, managing, and/or configuring the power system 100, as disclosed herein. Alternatively, or in addition, portions of the control infrastructure 140 (e.g., portions of the monitor 142, load profiler 144, manager 146, controller 148, and/or the like) may be embodied as separate hardware components and/or devices, firmware, hardware configuration data, and/or the like.

The monitor 142 may be configured to monitor portions of the power system 100 (e.g., monitor one or more of the PGUs 120A-N, the transmission infrastructure 112, the distribution infrastructure 114, the load 130, and so on). The monitor 142 may comprise an MCCD, as disclosed herein. The MCCD is not depicted in FIG. 1 to avoid obscuring the details of the disclosed embodiments. The monitor 142 may comprise and/or be communicatively coupled to one or more monitoring devices 111A-N, 121A-N, and/or 131A-N, which may be configured to monitor respective portions of the power system 100. The monitoring devices 111A-N, 121A-N, and/or 131A-N may include, but are not limited to: current sensors, voltage sensors, power sensors, phase sensors (current and/or voltage phase measurement devices), temperature sensors, fault detection devices (e.g., over-current detectors, over-voltage detectors, arc flash detectors, etc.), fault recorders, phasor measurement devices, phasor measurement and control devices, relays, protective relays, fail-over devices, and/or the like. One or more of the monitoring devices 111A-N, 121A-N, and/or 131A-N may comprise an MCCD, as disclosed above. Accordingly, one or more of the monitoring devices 111A-N, 121A-N, and/or 131A-N may be configured to control one or more components of the power system 100 (e.g., control one or more switches, buses, bus bars, and/or the like).

The monitoring devices 111A-N may be configured to monitor portions of the power system infrastructure 110 (e.g., the transmission infrastructure 112, distribution infrastructure 114, and so on), which may include, but is not limited to, monitoring: transmission lines, transformers, substations, switches, buses, bus bars, power conditioners, relays, protective relays, and/or the like. Although FIG. 1 depicts a single monitoring device 111A-N to avoid obscuring the details of the illustrated embodiments, the power system 100 could comprise any number of monitoring devices 111A-N configured to monitor and/or control any portion of the power system infrastructure 110.

The monitoring devices 121A-N may be configured to monitor one or more of the PGUs 120A-N, which may comprise monitoring power being generated by respective PGUs 120A-N, monitoring a generation and/or ramping trajectory of the PGUs 120A-N (as disclosed in further detail herein), monitoring PGU interface devices 115A-N (described in further detail herein), and/or the like.

The monitoring devices 131A-N may be configured to monitor the load 130 of the power system 100, which may include, but is not limited to: monitoring power consumed by the load 130 on the power system 100, monitoring power consumed within respective load regions 130A-N of the power system 100, monitoring power loss within the power system infrastructure 110, and/or the like. As used herein a "load region" 130A-N refers to a portion of the load 130 on the power system 100. A load region 130A-N may correspond to a portion of the load 130 associated with a particular geographical area, a particular electrical network (e.g., a particular substation), and/or the like. The monitoring devices 131A-N may be configured to monitor power consumption of the power system 100 at particular times (e.g., particular times of day), at a discrete monitoring interval (e.g., hourly), monitor power consumption in continuous-time, and/or the like.

The monitor 142 may be communicatively coupled to the monitoring devices 111A-N, 121A-N, and/or 131A-N by use of the power system communication infrastructure 118 and/or an external communication infrastructure 102. The monitor 142 may be configured to acquire monitoring data 152 pertaining to the power system 100 from the monitoring device 111A-N, 121A-N, and/or 131A-N. As disclosed above, the monitor 142 may comprise an MCCD. The monitor 142 may be configured to record and/or store the monitoring data 152 in a memory, in non-transitory storage, and/or the like. The monitor 142 may be configured to display portions of the monitoring data 152 on HMI components of the MCCD and/or transmit portions of the monitoring data 152 on an electronic communication network (by use of the communication resources of the MCCD). The monitor 142 may be further configured to communicate portions of the monitoring data 152 within the control infrastructure 140. As disclosed in further detail herein, the monitor 142 may provide the monitoring data 152 pertaining to power consumption to the load profiler 144, which may use the monitoring data 152 to determine a load profile 154 for the power system 100.

The power system controller (controller 148) may be configured to monitor, manage, and/or configure the power system 100 during real-time operation. The controller 148 may comprise a "real-time" or "operating" controller of the power system 100. The controller 148 may be configured to monitor, manage, and/or configure selected PGUs 120A-N to generate electrical power for the power system 100. The controller 148 may be further configured to monitor, manage, and/or configure the power system infrastructure 110 to distribute power being generated by the selected PGUs 120A-N to the load 130. In some embodiments, the controller 148 configures the power system 100 to operate according to a power system configuration 160. As disclosed in further detail herein, the power system configuration 160 may comprise an "optimal" configuration of the power system 100 during an operating period (e.g., a day). The power system configuration 160 may comprise a PGU configuration 162 adapted to, inter alia, configure and/or schedule selected PGUs 120A-N to generate power for the power system 100 during the operating period. The PGU configuration 162 may be adapted such that power generated by selected PGUs 120A-N during the operating period satisfies the power requirements of the power system 100. The power system configuration 160 may further comprise an infrastructure configuration 164 adapted to, inter alia, configure the power system infrastructure 110 in accordance with the PGU configuration 162. The infrastructure configuration 164 may be adapted to configure the transmission infrastructure 112 to accept power generated by the selected PGUs 120A-N in accordance with the PGU configuration 162, configure the distribution infrastructure 114 to distribute the power to the load 130, and so on.

The load profiler 144 may be configured to determine the load profile 154 for the power system 100, which may comprise a forecast of the "net load" on the power system 100 during a particular operating period. As used herein, the "net load" refers to power consumption within the power system 100 during a particular operating period (e.g., during a day). The net load on the power system 100 may comprise power consumed by the load 130, power losses within the power system infrastructure 110, and so on.

The load profiler 144 may be configured to determine the load profile 154 for the power system 100 based on any number of factors including, but not limited to: net load on the power system 100 during a current operating period (e.g., current day), net load on the power system 100 during one or more previous operating periods (e.g., previous days), environmental information (e.g., weather conditions in geographical regions serviced by the power system 100), load scheduling (e.g., scheduling for high load regions 130A-N, such as a factory), calendar information (e.g., weekends versus weekdays, holidays, events, and so on), heuristics, testing and experience, and/or the like.

The load profiler 144 may be configured to monitor the net load on the power system 100 by, inter alia, monitoring power consumption by use of the monitor 142 and/or monitoring devices 111A-N, 121A-N, and/or 131A-N. The load profiler 144 may be configured to monitor power consumption during real-time operation of the power system 100, which may include monitoring power consumed by the load 130 (and/or particular load regions 130A-N), monitoring power losses within the power system infrastructure 110, and so on. The load profiler 144 may be further configured to record power consumption monitoring data in a memory, non-transitory storage, and/or the like. The load profiler 144 may be configured to record power consumption monitoring data comprising one or more of: measurements of power consumption at particular times (e.g., measurements of power consumption at predetermined times of day), discrete-time measurements of power consumption at a particular monitoring interval or frequency (e.g., hourly power consumption), instantaneous measurements of power consumption, and/or the like. The power consumption monitoring data acquired by the load profiler 144 may comprise a sequence of power consumption samples and/or measurements quantifying power consumption at respective sample times and/or during respective monitoring intervals.

The load profiler 144 may use the monitored power consumption data to determine the load profile 154 for the power system 100. The load profile 154 may comprise a forecast of the net load for the power system 100 during a subsequent operating period (e.g., a day-ahead load profile). As disclosed above, determining the load profile 154 may comprise evaluating a plurality of different factors including, but not limited to: power consumption monitoring data pertaining to a current operating period (e.g., current day), power consumption monitoring data pertaining to one or more previous operating periods (e.g., previous days), environmental conditions, calendar information, heuristics, testing and experience, and/or the like. The load profile 154 may comprise a day-ahead load forecast for the power system 100. The load profile 154 may comprise a collection, set, and/or sequence of net load quantities, each of which may comprise a forecast of the net load on the power system 100 at a particular time and/or during a particular interval within an operating period of the power system 100 (e.g., during a next day of operation). The net load forecast quantities may forecast the net load on the power system 100 at respective sample times. Alternatively, or in addition, the net load forecast quantities may be interpreted as defining a load during a particular interval of operation (e.g., a piecewise linear projection of the net load on the power system 100 during a particular time interval). In some embodiments, the load profile 154 comprises 24 hourly net load forecast quantities, each comprising a net load forecast for the power system 100 at and/or during a particular hour.

The power system configuration manager 146 (or manager 146) may determine a power system configuration 160 for operation of the power system 100 during the operating period (e.g., the next day). As disclosed above, the power system configuration 160 may comprise a PGU configuration 162 and an infrastructure configuration 164. The manager 146 may adapt the PGU configuration 162 to select, configure, and/or schedule PGUs 120A-N to generate power during the operating period in accordance with the load profile 154 (e.g., to satisfy the net load forecast for the power system 100 during the operating period). The infrastructure configuration 164 may be adapted to configure the power system infrastructure 110 to accept power generated by the PGUs 120A-N (in accordance with selection, configuration, and/or scheduling of the PGUs 120A-N as defined in the PGU configuration 162). The infrastructure configuration 164 may be further adapted to configure the distribution infrastructure 114 to distribute power transferred from the selected PGUs 120A-N through the transmission infrastructure 112 to the load 130 and/or particular load regions 130A-N.

The some embodiments, the manager 146 may be configured to formulate the power system configuration 160 in accordance with a day-ahead Unit Commitment (UC) model. The manager 146 may be configured to formulate a UC model based on the load profile 154, PGU metadata 156A-N, and/or power system metadata 158. The PGU metadata 156A-N may model and/or define characteristics constraints, and/or properties of respective PGUs 120A-N, which may include, but are not limited to: generation capacity (maximum and/or minimum power capable of being generated by the PGU 120A-N), location(s) at which PGUs 120A-N can be electrically coupled to the transmission infrastructure 112, cost (e.g., cost for power generated by the PGU 120A-N, startup cost, shutdown cost, and so on), generation and/or ramping characteristics (disclosed in further detail herein), and so on. The power system metadata 158 may model and/or define characteristics, constraints, and/or properties of the power system 100, including, but not limited to: operating constraints, transmission constraints (e.g., capacity of various portions of the transmission infrastructure 112 and/or distribution infrastructure 114), DC power flow constraints, topology (e.g., bus locations at which respective PGUs 120A-N are capable of being electrically coupled to the transmission infrastructure 112), and so on.

The manager 146 may schedule PGUs 120A-N to satisfy the net load forecast of the load profile 154, which may comprise an hourly schedule of the PGUs 120A-N. The manager 146 may be configured to determine "decision variables" for the PGUs 120A-N, including an hourly commitment status (whether the PGU 120A-N is to be committed for power generation during a particular hour) and a generation schedule (an amount of power to be generated for the power system 100 by the PGU 120A-N during the particular hour). The decision variables may be used to configure the PGUs 120A-N during each interval of the operating period. The manager 146 may, therefore, be configured to generate decision variables for each PGU 120A-N during each interval of the operating period.

As disclosed above, the manager 146 may schedule PGUs 120A-N to satisfy an hourly net load forecast of the load profile 154, which may comprise scheduling PGUs 120A-N to generate a particular amount of power during respective hours. The manager 146 may formulate a power generation model (PGM) to model power generated by selected PGUs 120A-N operating according to a selected configuration (e.g., a model or function PGM(t) may model power generated by selected PGUs 120A-N at a particular time t and/or during a particular time interval). The manager 146 may select and/or schedule PGUs 120A-N during the operation period such that, for each time interval T, the power to be generated by selected PGUs 120A-N PGM(t) satisfies the net load quantity for the time interval T (e.g., PGM(T)=N(T)).

In some embodiments, the manager 146 may determine the power system configuration 160 by use of a UC model of the power system 100. The manager 146 may formulate the UC model as an instance of MILP in which a generation cost function and operating constraints (as defined in PGU metadata 156A-N and/or power system metadata 158) are linear with respect to the decision variables. The manager 146 may determine the power system configuration 160 by, inter alia, determining an optimal solution for the UC model in accordance with a particular optimization criterion (e.g., optimization and/or cost function). The manager 146 may, for example, be configured to determine a power system configuration 160 that satisfies the load profile 154 at minimal cost (e.g., schedule PGUs 120A-N to satisfy the net load requirements in accordance with cost characteristics of the respective PGUs 120A-N, as defined in the PGU metadata 156A-N).

Satisfying the discrete net load forecast quantities of the load profile 154 by use of a UC model (or other technique) may comprise configuring the power system 100 to satisfy constant and/or piecewise linear net load forecasts (e.g., hourly forecast quantities N(T)). Discrete and/or piecewise linear net load may not, however, adequately reflect inter-temporal variations in the net load during real-time operation of the power system 100; such inter-temporal variations may be due to, inter alia, generation and/or ramping trajectory characteristics of the PGUs 120A-N (which also may not be adequately modeled, as disclosed in further detail herein). Accordingly, a power system configuration 160 formulated to satisfy discrete and/or piecewise linear net load quantities may not accurately reflect real-time operation of the power system 100, which may reduce the ability of the power system 100 to respond to load fluctuations and/or render the power system 100 susceptible to scarcity events, such as ramping scarcity events as PGUs 120A-N are brought online in the power system 100.

The power system configuration 160 determined by the manager 146 may define "scheduled" capacity for the power system 100 during the operating period (e.g., a model of power system generation during the operating period, or PGM(t)). The scheduled capacity (PGM) may correspond to power generated by the selected PGUs 120A-N operating according to the configuration and/or schedule defined in the PGU configuration 162. In real-time operation, however, the power generated by the selected PGUs 120A-N may differ from the scheduled capacity (PGM(t)) due to, inter alia, inadequate modeling generation and/or ramping characteristics of the PGUs 120A-N.

Figure 2:
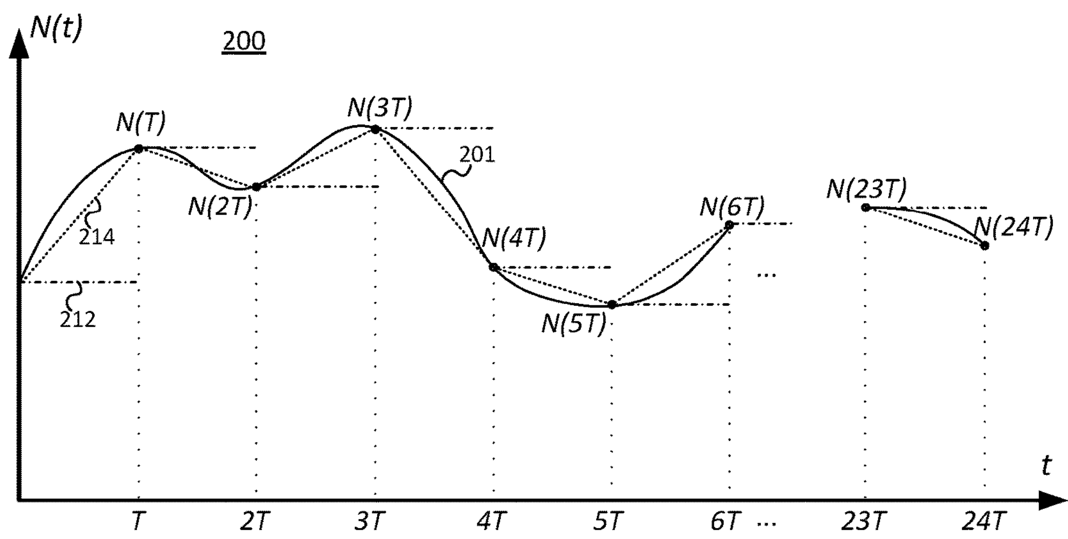
FIG. 2 depicts a plot illustrating net load forecast quantities, scheduled power generation, and real-time net load.

FIG. 2 is a plot 200 depicting the real-time load on a power system 100, net load forecast quantities N(T), and "modeled" power generated by PGUs 120A-N (PGM(T)) in accordance with a power system configuration 160. Plot line 201 depicts a real-time load on the power system 100 during a 24-hour operating period. The real-time load 201 may be divided into a portion that was "scheduled" in accordance with the power system configuration 160 (PGM(t)), and a portion that needs to be supplied by other available resources due to shortfalls in the scheduled capacity (e.g., where real-time net load exceeds scheduled capacity). Deviation between the real-time load 201 and the "scheduled" load may be due to, inter alia, inaccuracies in the UC modeling and/or formulation techniques for determining the power system configuration 160. For example, the use of discrete net load values N(T) may not accurately reflect inter-temporal variations and/or fluctuations of the load in the power system 100 due to, inter alia, ramping events. Similarly, the model for the "scheduled" capacity provided by the PGUs 120A-N (PGM(t)) may differ from actual, real-time power generation due to, inter alia, inadequate modeling of the generation and/or ramping trajectory of the PGUs 120A-N. As used herein, the "generation trajectory" of a PGU 120A-N refers to characteristics of power generated by the PGU 120A-N as the PGU 120A-N transitions between different power generation states and/or levels (e.g., from generating no power for the power system 100 to generating a particular amount of power for the power system 100).

As disclosed above, the manager 146 may be configured to formulate the power system configuration 160 to satisfy discrete net-load forecast quantities, values, and/or samples N(T) as defined in a load profile 154 for the power system 100. FIG. 2 depicts a set of hourly net-load forecast values N(T . . . 24T). The PGU configuration 162 may comprise hourly decision variables for each PGU 120A-N, which may define the commitment status and generation schedule for the PGU 120A-N during each hour of operation (T). The PGU configuration 162 formulated by the manager 146 may, therefore, treat the PGUs 120A-N as being capable of instantly transitioning to the power generation levels specified for each interval; more specifically, for the purposes of formulating the power system configuration 160, the manager 146 may model the PGUs 120A-N as having a constant piecewise generation trajectory (PGM(t)). In FIG. 2, plot line 212 depicts an exemplary constant piecewise generation trajectory corresponding to the discrete net load values N(T)-N(24T). Although the manager 146 may configure the PGUs 120A-N to smoothly transition to different power levels (since instantaneous transitions may not be possible), such smoothing may be performed after formulation of the PGU configuration 162 and, as such, may not be reflected in the formulation of the power system configuration 160 itself. Alternatively, the manager 146 may formulate the power system configuration 160 such that the generation trajectory of the PGUs 120A-N is interpreted as being consistent with ramping constraints of the discrete net-load forecasts N(T . . . 24T) (e.g., the hourly intervals between respective net load forecast values). The generation trajectory of selected PGUs 120A-N (or PGM(t)) may, therefore, be viewed as following a linear trajectory from one hourly generation schedule to the next. In FIG. 2, a linear trajectory of scheduled capacity is depicted by plot line 214.

As illustrated in FIG. 2, the scheduled capacity corresponding to the power system configuration 160 formulated to satisfy discrete-time and/or piecewise linear net load may not accurately model sub-interval variations in the net load (inter-hour variations) and/or may not accurately reflect generation trajectory characteristics of the PGUs 120A-N.

Figure 3:
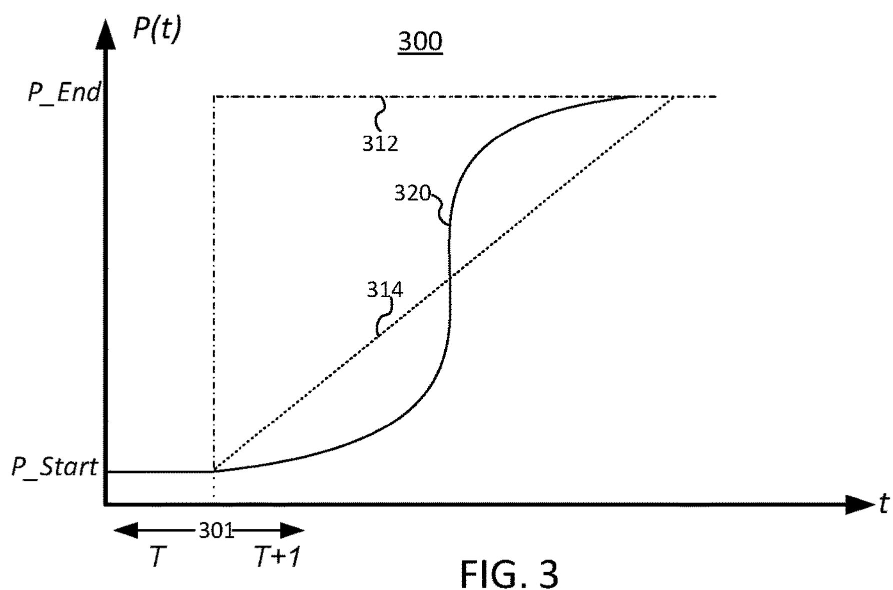
FIG. 3 is a plot depicting embodiments of generation trajectory models.

FIG. 3 is a plot 300 depicting models for a generation trajectory of a PGU 120A-N. The plot 300 may correspond to a PGU configuration 162 in which a PGU 120A-N is scheduled to provide a particular amount of power during interval T (P_Start), and to transition to generating an increased amount of power (P_End) at the beginning of a next interval T+1 (301). As mentioned above, the manager 146 may schedule power from PGUs 120A-N as if the PGUs 120A-N are capable of transitioning from P_Start to P_End instantaneously, as depicted by plot line 312. Alternatively, the UC model may be interpreted as viewing the generation trajectory of the PGU 120A-N as a linear ramp, as depicted by plot line 314. The generation trajectories of discrete and/or piecewise linear UC models may not accurately reflect the generation trajectory 320 of the PGU 20A-N during real-time operation, as depicted. Therefore, the generation trajectory of the PGUs 120A-N "assumed" by the manager 146 may not reflect actual, real-time operation and, as such, the scheduled power generation may not satisfy net load on the power system 100 as expected (e.g., the power system 100 may be subject to ramping scarcity events as PGUs 120A-N ramp up power generation).

As disclosed above, configuring the power system 100 to satisfy discrete and/or linear net load forecasts (and inadequate consideration of actual generation trajectory characteristics of the PGUs 120A-N) may result in deviations between scheduled capacity and real-time load conditions, which may require the power system 100 to acquire additional capacity (at increased cost), decrease the availability of the power system 100 to respond to load fluctuations, render the power system 100 susceptible to scarcity conditions, and/or result in ramping scarcity events.

Referring back to FIG. 1, in some embodiments, the power system configuration manager 146 is configured improve the power system configuration 160 (e.g., reduce deviation between scheduled capacity and real-time net load) by, inter alia, identifying and/or modeling inter-temporal variations in the net load forecast for the power system 100. More specifically, the manager 146 may be configured to determine an inter-temporal load profile 155 that models inter-temporal, inter-interval, and/or inter-sample variations in the net load forecast of the net load profile 154. As disclosed above, the load profile 154 may comprise a plurality of net load quantities, each net load quantity comprising a forecast of the net load at a particular time and/or during a particular time interval. The net load quantities may, therefore, comprise constant and/or linear net load forecasts at respective sample times and/or during respective time intervals. The manager 146 may formulate an inter-temporal load profile 155 to model inter-temporal variations between respective net load quantities (e.g., between respective sample times and/or intervals of respective net load quantities, such as inter-hour variation in an hourly day-ahead forecast).

In some embodiments, the manager 146 is configured to determine the inter-temporal load profile 155 by use of, inter alia, numerical techniques such as interpolation, function projection, expansion, and/or the like. In some embodiments, the manager 146 may determine the inter-temporal load profile 155 by expressing the net load samples in continuous-time and/or by use of higher-order function space (e.g., higher order than 1 per the constant and/or piecewise linear view of the net load quantities N(t), as disclosed above). The inter-temporal load profile 155 may comprise a polynomial, exponential, and/or other type of model of the net load quantities. In some embodiments, and as disclosed in further detail herein, the manager 146 may be configured to model the net load quantities as cubic splines, which may comprise projecting the net load quantities of the load profile 154 into a higher-order function space (e.g., Hermite function space). The inter-temporal load profile 155 may, therefore, comprise expanding a constant and/or piecewise linear sequence of net load quantities into a higher-order model of net load. The inter-temporal load profile 155 may be configured to reflect non-linear variations between respective sample periods and/or time intervals of the net load quantities (e.g., within respective time intervals of the load profile 154).

The manager 146 may be further configured to generate a power system configuration 160 adapted to satisfy the inter-temporal load profile 155, which may comprise selecting, scheduling, and/or configuring one or more PGUs 120A-N to satisfy inter-temporal variations in the net load as defined in the inter-temporal load profile 155 (e.g., variations within particular hours of a day-ahead load forecast). The manager 146 may be further configured to select, schedule, and/or configure PGUs 120A-N to satisfy non-linear variations in the net load.

As disclosed above, the PGU configuration 162 determined by the manager 146 may comprise a "scheduled" capacity for the power system 100. The scheduled capacity may correspond to a model of power generated by selected PGUs 120A-N according to the configuration and/or schedule of the PGU configuration 162. The PGUs 120A-N may be assumed to be capable of instantly transitioning (or making linear transitions) between different generation levels during different time intervals. These assumptions may not reflect generation and/or ramping characteristics of the PGUs 120A-N. The manager 146 may be configured to model continuous-time generation and/or ramping trajectory of the PGUs 120A-N, such that the PGUs 120A-N are not assumed to have an instantaneous or piecewise linear generation trajectory (e.g., per plot lines 212 and/or 214 of FIGS. 2 and 312 and/or 314 of FIG. 3). The manager 146 may model the continuous-time generation and/or ramping characteristics of the PGUs 120A-N by monitoring the PGUs 120A-N (by use of monitoring devices 121A-N and/or PGU interface devices 115A-N, disclosed in further detail herein), based on properties/characteristics of the PGUs 120A-N, through testing and experience, and/or the like. The generation and/or ramping characteristics of the PGUs 120A-N may model a non-linear, continuous-time generation and/or ramping trajectory of the PGUs 120A-N during real-time operation. The manager 146 may be further configured to maintain and/or record the generation and/or ramping characteristics of PGUs 120A-N in PGU generation/ramping (PGUGR) metadata 157A-N and to select, schedule, and/or configure PGUs 120A-N in the power system configuration 160 in accordance with the determined, inter-temporal, non-linear generation and/or ramping characteristics thereof. The manager 146 may be configured to model power generated by selected PGUs 120A-N (PGM (t)) in accordance with the generation and/or ramping trajectories of the PGUs 120A-N, as opposed to modeling the PGUs 120A-N as being capable of instantly transitioning to different power generation levels (and/or performing piecewise linear transitions).

In some embodiments, the manager 146 comprises a power system modeler 147 configured to a) determine the inter-temporal load profile 155 for the power system 100, and b) select, schedule, and/or configure PGUs 120A-N in the PGU configuration 162 to satisfy the inter-temporal load profile 155, in accordance with the continuous-time generation and/or ramping trajectories thereof (as defined in the PGUGR metadata 157A-N). The modeler 147 may be configured to interpolate, expand, and/or project the net load quantities of the load profile 154 into the inter-temporal load profile 155, as disclosed herein. The modeler 147 may be further configured to model the generation and/or ramping trajectory of the respective PGUs 120A-N, as disclosed herein. The modeler may formulate the inter-temporal load profile 155 and/or generation/ramping trajectories of the PGUs 120A-N as a UC model, and may determine an optimal solution to the model according to a particular criterion (e.g., objective function, such as a cost optimization function and/or the like). The optimal solution to the UC model may correspond to a particular selection, scheduling, and/or configuration of the PGUs 162 and/or infrastructure 164 for a power system configuration 160. The manager 146 may provide the power system configuration 160 to the power system controller 148 (controller 148), which may be configured to manage the real-time operation of the power system 100 accordingly.

As disclosed above, the controller 148 may be configured to manage real-time operation of the power system 100 in accordance with the power system configuration 160 determined by the manager 146. In some embodiments, the controller 148 may manage operation of the PGUs 120A-N by use of one or more PGU interface devices 115A-N. The PGU interface devices 115A-N may comprise MCCDs, as disclosed herein. The PGU interface devices 115A-N may comprise electrical hardware configured to selectively couple one or more PGU 120A-N to the power system infrastructure 110, such that electrical power produced thereby is available for transmission and/or distribution within the power system 100 (e.g., to the load 130). Accordingly, a PGU interface device 115A-N may comprise components of the transmission infrastructure 112 and/or distribution infrastructure 114, such as transmission lines, a transformer, a switch, a bus, a bus bar, a substation, a power conditioner, and/or the like. The controller 148 may be configured to selectively couple PGUs 120A-N to the transmission infrastructure 112 of the power system 100 by use of the PGU interface devices 115A-N.

The controller 148 may be adapted to configure the PGUs 120A-N to generate power for the power system 100 in accordance with the PGU configuration 162 of the power system configuration 160. The controller 148 may be configured to transmit PGU requests 166 to the PGUs 120A-N through the power system communication infrastructure 118 and/or external communication infrastructure 102. The PGU requests 166 may be configured to select, schedule, and/or configure PGUs 120A-N to generate power for the power system 100 during real-time operation. Alternatively, or in addition, the controller 148 may interface with the PGUs 120A-N through one or more PGU interface devices 115A-N. In some embodiments, one or more of the PGU interface devices 115A-N may be communicatively coupled to respective PGUs 120A-N. The PGU interface devices 115A-N may convey the PGU requests 166 (e.g., commitment, scheduling, and/or configuration information) to the PGUs 120A-N.

The controller 148 may be further configured to configure the infrastructure of the power system 100 in accordance with the power system configuration 160. The controller 148 may be configured to adapt the transmission infrastructure 112 to accept power from selected PGUs 120A-N in accordance with the PGU configuration 162, and may adapt the distribution infrastructure 114 to distribute the power to the load 130.

The controller 148 may configure the power system infrastructure 110 by use of one or more control devices 113A-N. The control devices 113A-N may be configured to control respective elements within the power system infrastructure 110, such as switches, buses, bus bars, relays, protective relays, transformers, and so on. The control devices 113A-N may be configured to control power flow within the power system infrastructure 110, which may comprise configuring the transmission infrastructure 112 to accept power being generated for the power system 100 by one or more of the PGUs 120A-N and to transfer the power into the distribution infrastructure 114, and configuring the distribution infrastructure 114 to distribute the electrical power transferred thereto to the load 130 (and/or particular load regions 130A-N), as disclosed herein.

One or more of the control devices 113A-N may comprise an MCCD, as disclosed herein. Accordingly, one or more of the control devices 113A-N may comprise processing resources, memory resources, non-transitory storage resources, HMI components, communication resources, and so on, as disclosed herein. FIG. 1 depicts only one of the control devices 113A-N, and omits the individual components thereof, to avoid obscuring the details of the depicted embodiments. One or more of the control devices 113A-N may be configured to monitor portions of the power system 100, as disclosed herein. Therefore, one or more of the control devices 113A-N and/or monitoring devices 111A-N may be embodied as the same device (e.g., a monitoring and control device, such that the control device 113A-N comprises the monitoring device 111A-N, and vice versa). Alternatively, or in addition, one or more of the control devices 113A-N may be embodied as a separate device from the monitor 142 and/or monitoring devices 111A-N, 121A-N, and/or 131A-N. The controller 148 may be configured to manage real-time operation of the power system infrastructure 110 in accordance with the infrastructure configuration 164. The controller 148 may be configured to adapt the power system infrastructure 110 to the infrastructure configuration 164 by use of the control devices 113A-N and, more specifically by formulating and transmitting power system configuration commands 168 (commands 168) to the control devices 113A-N. The commands 168 may be transmitted through an electronic communication network of the power system communication infrastructure 118, external communication infrastructure 102, and/or the like. The commands 168 may be adapted to configure the power system infrastructure 110 in accordance with the infrastructure configuration 164 (e.g., to accept and/or distribute power being generated by the PGUs 120A-N in accordance with the PGU configuration 162).

As disclosed above, the monitor 142 may be configured to monitor portions of the power system 100 during real-time operation. In some embodiments, the monitor 142 captures monitoring data pertaining to the PGUs 120A-N (by use of monitoring devices 121A-N and/or PGU interface devices 115A-N). The monitor 142 may provide PGU monitoring data to the modeler 147, which may compare power generated by the PGUs 120A-N (and/or the generation and ramping trajectories of the PGUs 120A-N) to the PGU metadata 156A-N and/or PGUGR metadata 157A-N. The modeler 147 may be configured to refine characteristics, constraints, and/or properties of the PGUs 120A-N in accordance with the PGU monitoring data (e.g., to better reflect real-time operational characteristics of the PGUs 120A-N). The modeler 147 may be further configured to determine generation and/or ramping characteristics for the PGUs 120A-N (by use of the PGU monitoring data), and to refine the respective generation and/or ramping trajectories of the PGUs 120A-N accordingly.

Figure 4:
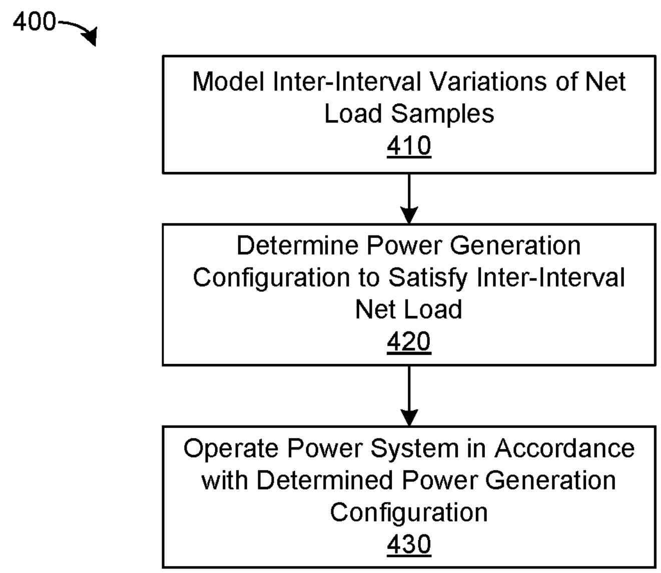
FIG. 4 is a flow diagram of one embodiment of a method for managing a power system.

FIG. 4 is a flow diagram of one embodiment of a method 400 for managing a power system 100. One or more of the steps of the method 400 (and/or the other methods disclosed herein) may be embodied as instructions stored on a non-transitory computer-readable storage medium. The instructions may be configured to cause a computing device, such as an MCCD and/or computing device 141, to perform the disclosed processing steps and/or operations. Alternatively, or in addition, one or more of the steps of the method 400 (and/or the other methods disclosed herein) may be embodied and/or implemented by hardware components, such as a circuit, monitoring device, control device, communication device, and/or the like. Step 410 may comprise determining an inter-interval and/or inter-temporal load profile 155 for the power system 100 during an operating period. The inter-temporal load profile 155 may be based on a load profile for the power system 100, which may comprise a plurality of net load quantities, each net load quantity forecasting a load on the power system 100 at a particular time and/or during a particular interval. Step 410 may comprise determining the load profile 154. Step 410 may comprise accessing the monitoring data 152 pertaining to the power system 100 and/or acquiring the monitoring data 152 by use of monitoring devices 111A-N, 121A-N, 131A-N, monitor 142, and/or the like. The monitoring data 152 may comprise a plurality of data samples and/or measurements. The data samples and/or measurements may correspond to a particular sample period (e.g., every N seconds, every hour, and/or the like). Step 410 may comprise determining net load quantities to forecast the net load on the power system 100 at respective times and/or during respective time intervals, as disclosed herein.

In some embodiments, step 410 comprises determining an inter-temporal load profile 155 corresponding to a sequence of net load samples (of the load profile 154), each net load sample defining a constant, linear, and/or piecewise linear net load on the power system 100 during a respective time interval. Step 410 may comprise modeling variances to the net load within one or more of the time intervals. Step 410 may comprise modeling non-linear variances in the net load, as disclosed above. In some embodiments, step 410 may comprise modeling, expanding, and/or projecting the samples into a higher-order function space (e.g., cubic splines). In some embodiments, step 410 comprises projecting the net load quantities into a cubic Hermite function space.

Step 420 may comprise determining a PGU configuration 162 for the power system 100. Step 420 may comprise determining the PGU configuration 162 to select, configure, and/or schedule PGUs 120A-N to generate power for the power system 100 during the operating period. The PGU configuration 162 may be adapted to select, configure, and/or schedule PGUs 120A-N to satisfy the net load forecast for the power system 100, which may comprise selecting, configuring, and/or scheduling PGUs 120A-N to satisfy the inter-temporal variations of the net load modeled at step 410.

Step 430 may comprise managing real-time operation of the power system 100 in accordance with the PGU configuration 162 of step 420. Step 430 may comprise issuing the PGU requests 166 to one or more of the PGUs 120A-N to commit (e.g., schedule) power generation. The PGU requests 166 may further specify an operating configuration of the PGUs 120A-N, such as generation characteristics (e.g., how much power to generate at particular times), ramping characteristics (e.g., how fast to ramp up power generation), and so on. Step 430 may further comprise configuring the power system infrastructure 110 in accordance with the infrastructure configuration 164, as disclosed herein (e.g., by generating and/or issuing power system configuration commands 168 to respective control devices 113A-N deployed within the power system infrastructure 110).

Figure 5:
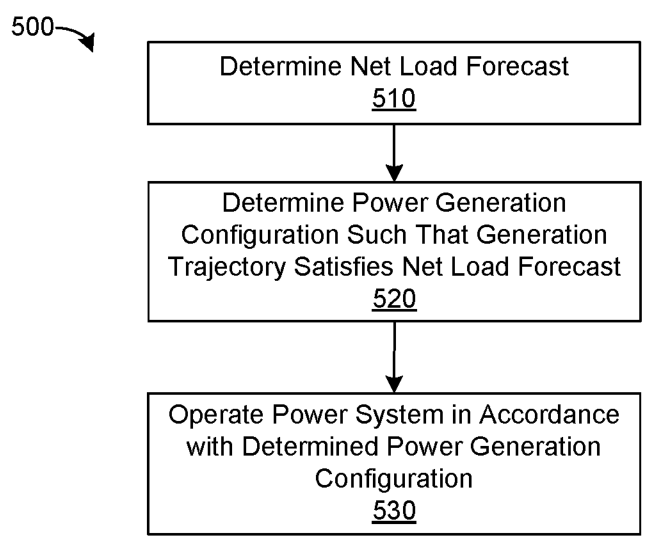
FIG. 5 is a flow diagram of another embodiment of a method for managing a power system.

FIG. 5 is a flow diagram of another embodiment of a method 500 for managing a power system 100. Step 510 may comprise determining a load profile 154 for the power system 100 as disclosed herein. The load profile 154 may comprise a sequence of net load quantities, each forecasting a load on the power system 100 at a particular time and/or during a particular time interval. Step 510 may comprise determining and/or modeling inter-interval variance in the load profile 154, as disclosed herein. The inter-interval variances may comprise non-linear variations of the net load between respective net load quantities.

Step 520 may comprise determining a PGU configuration 162 to satisfy the determined load profile 154 for the power system 100. Step 520 may comprise selecting, scheduling, and/or configuring PGUs 120A-N during the operating period. Step 520 may comprise accessing generation and/or ramping characteristics of the PGUs 120A-N (PGUGR metadata 157A-N), which may define continuous-time and/or non-linear generation and/or ramping characteristics of the PGUs 120A-N. Step 520 may comprise selecting, scheduling, and/or configuring the PGUs 120 to generate power for the power system 100 in accordance with the generation and/or ramping characteristics thereof.

Step 530 may comprise managing real-time operation of the power system 100 in accordance with the PGU configuration 162 of step 520. As disclosed herein, step 530 may comprise issuing the PGU requests 166 to one or more of the PGUs 120A-N to commit (e.g., schedule) power generation, issuing commands 168 to configure the power system infrastructure 110, and so on.

Figure 6:
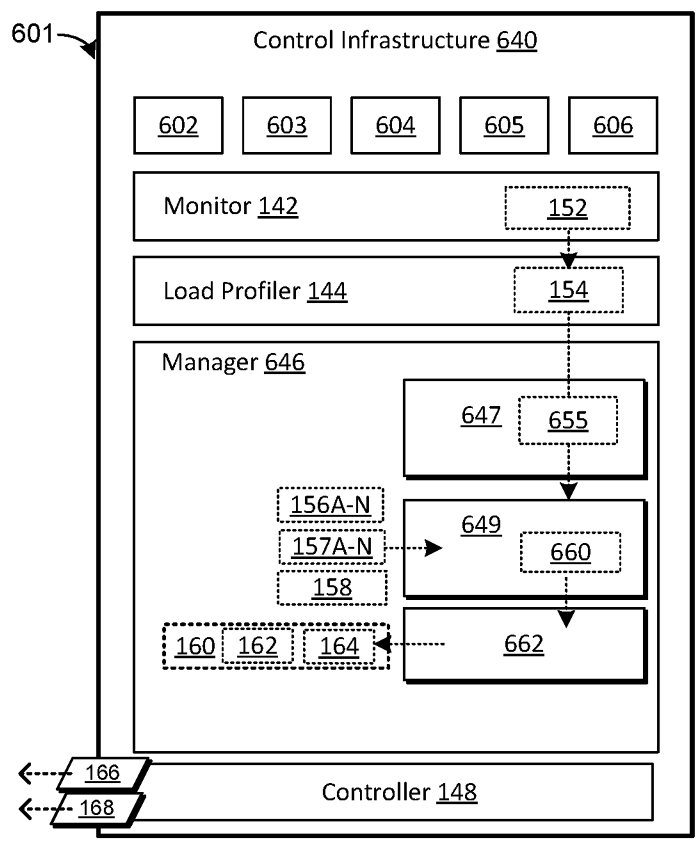
FIG. 6 is a schematic block diagram of one embodiment of an apparatus for managing a power system.

FIG. 6 is a schematic block diagram of one embodiment of control infrastructure 640 of the power system 100. FIG. 6 omits certain components of the power system 100 to avoid obscuring the details of the illustrated embodiments. The control infrastructure 640 may comprise and/or be embodied on an MCCD 601, which, as disclosed herein, may comprise processing resources 602, memory resources 603, non-transitory storage resources 604, communication resources 605, HMI components 606, and/the like. The control infrastructure 640 may comprise the monitor 142, the load profiler 144, a power system configuration manager 646, and the operating controller 148. The monitor 142 may be configured to acquire the monitoring data 152 pertaining to the power system 100 by use of, inter alia, monitoring devices, such as the monitoring devices 111A-N, 121A-N, and/or 131A-N, disclosed herein.

The load profiler 144 may be configured to determine a load profile 154 for the power system 100. The load profile 154 may comprise a forecast of the net load on the power system 100 during a particular operating period (e.g., a day-ahead forecast). The load profile 154 may comprise a plurality of net load quantities, each corresponding to a net load forecast for the power system 100 at a particular time and/or during a particular interval. The net load quantities may correspond to power consumption measurement data captured at particular sampling and/or measurement intervals. The load profiler 144 may derive the load profile 154 (and/or the sample points thereof) from power consumption monitoring data and/or other factors, as disclosed herein.

The power system configuration manager 646 (or manager 646) may be configured to determine a power system configuration 160. The power system configuration 160 may comprise a PGU configuration 162 and an infrastructure configuration 164, as disclosed herein. The PGU configuration 162 may select, schedule, and/or configure PGUs 120A-N to generate power during an operating period. The infrastructure configuration 164 may be adapted to configure the power system infrastructure 110 to distribute power generated by the selected PGUs 120A-N to the load 130 (and/or particular load regions 130A-N). The operating controller 148 may be configured to manage real-time operation of the power system 100 in accordance with the determined power system configuration 660, as disclosed herein.

In the FIG. 6 embodiment, the manager 646 may be configured to model inter-temporal variations in the load profile 154 and/or model generation and/or ramping trajectory of respective PGUs 120A-N (by use of PGUGR metadata 157A-N). The manager 646 may be further configured to formulate the PGU configuration 162 in accordance with the inter-temporal net load profile 655 and/or generation/ramping trajectories of the PGUs 120A-N.

As disclosed above, approaches to scheduling PGUs on an hourly basis (and in accordance with an hourly net load forecast) may be interpreted as a linear approximation of net load and/or generation trajectory, which may not accurately reflect real-time operations of the power system 100, leading to inaccuracies (and susceptibility to ramping scarcity conditions).

The day-ahead UC formulation for scheduling generation resources may be expressed as a continuous-time optimization system, as follows:

$$\min \int_{\Omega} C(G(t), I(t))\,dt$$

$$s.t. f(G(t), I(t)) = 0$$

$$h(G(t), G'(t), I(t)) \leq 0 \quad \text{Eq. 1.}$$

In Eq. 1, C may comprise a cost function, G(t) models power generation of selected PGUs 120A-N as a function of time (e.g., generation trajectory), G'(t) may comprise the time derivative of G(t) (e.g., ramping trajectory), I(t) represents commitment variables for respective PGUs 120A-N (decision variables), and Ω represents the operating period (e.g., scheduling horizon, such as a day-ahead). Solving the UC formulation of Eq. 1 may comprise determining an hourly commitment scheme that minimizes total generation cost during the operating period Ω. The functions f and h may comprise UC equality and inequality constraints, including, but not limited to: a balance constraint, PGU generation capacity, ramping, minimum on/off time, startup and shutdown costs, and so on. The functions f and h may, therefore, be defined by the PGU metadata 156A-N and/or power system metadata 158, as disclosed herein. In some discrete-time UC techniques, commitment variables I(t) may be limited to hourly changes of commitment status. The generation trajectory G(t), however, may be adapted to change between consecutive hourly schedules. As illustrated below, the solution to the hourly day-ahead schedule of Eq. 1 lies in a linear function space. Since all polynomial splines of the same order are equivalent (e.g., span the same sub-space), the generation schedule, constraints, and cost function of Eq. 1 may be interpreted as polynomials (e.g., interpreted in terms of shifts of Bernstein polynomials of degree 1).

Bernstein polynomials of degree n may be defined as:

$$B_{k,n}(t) = \binom{n}{k} t^k (1-t)^{n-k},\ k \in [0, n],\ t \in [0, 1]. \quad \text{Eq. 2}$$

In Eq. 2 k refers to a kth PGU 120A-N, m refers to a particular interval (e.g., hour), and n refers to a segment of a linearized cost function. Referring back to FIG. 2, the linear spline approximation of the discrete net load forecast points N(T)-N(24T) may be expressed in each hourly sub-interval m in the function space of two Bernstein polynomials of degree 1. More particularly, as $B_{0,1}(t)$–t and $B_{1,1}(t)$=1–t, weighted by the value of load at the beginning and end of the hour, as follows:

$$\hat{N}(t) = N_m^{B0} B_{0,1}(t) + N_m^{B1} B_{1,1}(t)\ t_m \leq t < t_{m+1} \quad \text{Eq. 3.}$$

In Eq. 3, $N_m^{B0}$=N($t_m$) and $N_m^{B1}$=N($t_{m+1}$) may comprise the coefficients of the net load forecast in the linear function space, defining the vectors:

$$B_1 = (B_{0,1}(t); B_{1,1}(t))^T, N_m = (N_m^{B0}, N_m^{B1})^T, \quad \text{Eq. 4.}$$

The linear expansion of Eq. 3 may be expressed in matrix form over the day-ahead scheduling horizon Ω as follows:

$$\hat{N}(t) = \sum_{m=0}^{M-1} B_1^T(\tau_m) N_m. \quad \text{Eq. 5}$$

In Eq. 5, the term $\tau_m$=(t–$t_m$)/($t_{m+1}$–$t_m$) translates and rescales $B_1$(t) to cover respective periods $t_m \leq t \leq t_{m+1}$. The continuous-tie load model of Eq. 5 may, therefore, represent the piecewise linear load profile depicted by line 214 in FIG. 2 in the 2M-dimensional function space of the Bernstein polynomials of degree 1.

The continuous-time generation trajectory corresponding to the discrete-time schedule of generating units (e.g., PGU configuration 162 comprising hourly scheduling of PGUs 120A-N) may also be an element of the same 2M-dimensional function space spanned by M=24 shifts of the Bernstein polynomials of degree 1, as follows:

$$G_k(t) = \sum_{m=0}^{M-1} B_1^T(\tau_m) G_{k,m}. \quad \text{Eq. 6}$$

In Eq. 6, $G_{k,m}=(G_{k,m}^{B0},G_{k,m}^{B0})^T$ represents the coefficients of the continuous-time generation trajectory of generating unit k at hourly interval m. The coefficients of the expansion equal to the hourly generation schedules may be expressed as:

$$G_{k,m}^{B0}=G_k(t_m),G_{k,m}^{B1}=G_k(t_{m+1}). \quad \text{Eq. 7.}$$

Although the continuous-time generation schedule lies in the 2M-dimensional function space, the number of degrees of freedom is m, due to generation continuity at the intersection of hourly intervals, per Eq. 8 below:

$$G_{k,m-1}^{B1}=G_{k,m}^{B0}=G_k(t_m),\forall m>1. \quad \text{Eq. 8.}$$

The quadratic cost function of generating units may be approximated by a piecewise linear cost function, which may be configured to preserve the linearity of the UC formulation of Eq. 4:

$$C_k(G_k(t), I_k(t)) = C_k(G_k^{min})I_k(t) + \sum_{n=0}^{N_k-1} \gamma_{k,n}(t)\Gamma_{k,n}(t). \quad \text{Eq. 9}$$

In Eq. 9, the capacity range of generating unit k is divided into $N_k$ sections using intermediate generation points $g_0=G_k^{min}$, $g_1$, $g_2$, . . . $g_{Nk}=G_k^{max}$, and $N_k$ number of auxiliary generation variables $\Gamma_{k,n}(t)$ are defined to model the generation schedule in each of the linear sections. The total generation of generating unit k may, therefore, be stated in terms of the auxiliary generation variables $\Gamma_{k,n}(t)$, as follows:

$$G_k(t) = G_k^{min}I_k(t) + \sum_{n=0}^{N_k-1} \Gamma_{k,n}(t). \quad \text{Eq. 10}$$

$$0 \le \Gamma_{k,n}(t) \le g_{n+1} - g_n. \quad \text{Eq. 11}$$

The auxiliary generation variables $\Gamma_{k,n}(t)$ may also be expressed in the 2M-dimensional function space spanned by $\{\{B_1^T(\tau_m)\}_{m=0}^{M-1}$, as follows:

$$\Gamma_{k,n}(t) = \sum_{m=0}^{M-1} B_1^T(\tau_m)\Gamma_{k,n,m}. \quad \text{Eq. 12}$$

The continuous-time relation in Eq. 10 may be equivalent to the following constraint on the coefficients:

$$G_{k,m} = G_k^{min}I_{k,m} + \sum_{n=0}^{N_k-1} \Gamma_{k,n,m}. \quad \text{Eq. 13}$$

In Eq. 13, $I_{k,m}=(I_k(t_m), I_k(t_{m+1}))^T$, and $G_k^{min}$ may comprise the minimum generation capacity of generating unit k. The cost function coefficients in Eq. 9 are assumed to be constant over each period (hour), such that:

$$\gamma_{k,n}(t)\approx\gamma_{k,n}(t_m)t_m\le t<t_{m+1}, \quad \text{Eq. 14.}$$

This assumption may accurately reflect an hourly market environment in which power generation resources are committed, priced, and/or scheduled according to hourly intervals. The total generation cost of generating unit k over the day-ahead scheduling horizon S2 may, therefore, be calculated using the function space representation of the auxiliary generation variables $\Gamma_{k,n}(t)$ of Eq. 12, as follows:

$$\int_\Omega C_k(G_k(t), I_k(t))dt = \sum_{m=0}^{M-1}\left[C_k(G_k^{min})I_k(t_m) + \sum_{n=0}^{N_k-1} \gamma_{k,n}(t_m)\Gamma_{k,n}(t_m)\right]. \quad \text{Eq. 15}$$

As described above, the linear approximation of net load and/or generation trajectory of Eqs. 1-15 may not accurately mode sub-hourly variations in net load, nor consider non-linear generation and/or ramping trajectories of the PGUs 120A-N. Therefore, in some embodiments, the manager 646 may be configured to formulate the net load projection and/or generation trajectory within a higher-order, non-linear function space. Accordingly, the net load forecast of the load profile 154 and/or generation trajectory (e.g., the scheduled capacity) may be expressed as cubic splines. Cubic splines may interpolate points with minimum curvature while providing additional flexibility to fit continuous-time load variations (which are not reflected in hourly net load and/or generation systems).

In some embodiments, the manager 646 may comprise a net load modeler 645 configured to determine the inter-temporal net load profile 655 for the power system 100, which may comprise deriving a cubic spline representation of the net load. As disclosed in further detail herein, the CSNRL 655 may comprise a projection in cubic Hermite function space. The manager 646 may further comprise a UC modeler 649 to formulate a UC model 660 for a power system 100 (and CSNRL 655), and a UC processor 662 to determine an optimal solution to the UC model 660 (which may correspond to a power system configuration 160 for the power system 100).

The manager 646 may be configured to project the net load and/or generation trajectory by use of a Hermite basis and/or Bernstein polynomials of degree 3 (by use of the net load modeler 645). The Hermite basis may enable coefficients of the expansion to be defined as samples of generation and generation rate of change (e.g., ramp). Bernstein polynomials may be useful as a proxy expansion to enforce capacity and ramping constraints for continuous-time generation trajectory. Although particular implementations for projecting the net load and/or generation trajectory into a cubic spline function space are described herein, the disclosure is not limited in this regard and could be adapted to utilize any non-linear and/or higher-order model for net load and/or generation trajectory.

The manager 146 may be configured to determine a continuous-time representation of the net load in the cubic spline function space. As disclosed above, the load profile 154 may comprise a sequence of sample points (net load projections) which may be distributed into M intervals within the scheduling horizon Ω (e.g., the next 24-hours of operation). The net load projections of the load profile 154 may comprise points 0, $t_1$, $t_2$, . . . $t_M$. The Hermite polynomial bases in t [0, 1] are:

$$H_{00}(t)=(2t^3-3t^2+1)\Pi(t)$$

$$H_{01}(t)=(t^3-2t^2+t)\Pi(t)$$

$$H_{10}(t)=(-2t^3-3t^2)\Pi(t)$$

$$H_{11}(t)=(t^3-t^2)\Pi(t)$$

The Hermite polynomial basis may comprise entries of the vector $H(t)=(H_{00}(t),H_{01}(t),H_{10}(t),H_{11}(t))^T$. The coefficients of the cubic Hermite approximation of load over the mth interval may be denoted as the vector $N_m^H=(N_m^{00},N_m^{01},N_m^{10},N_m^{11})^T$, and the Hermite approximation of the day-ahead load profile may be expressed as:

$$\hat{N}(t)=\sum_{m=0}^{M-1} H^T(\tau_m)N_m^H. \quad \text{Eq. 16}$$

The manager 146 may configure Eq. 16 such that the coefficients of the cubic Hermite approximation of the net load are uniquely defined by the value of load and the load derivate (e.g., ramp) at the starting and ending point of respective intervals, in accordance with Eqs. 17 and 18 below:

$$N_m^{00}=\hat{N}(t_m), N_m^{10}=\hat{N}(t_{m+1}), \quad \text{Eq. 17.}$$

$$N_m^{01}=\hat{N}'(t_m), N_m^{11}=\hat{N}'(t_{m+1}). \quad \text{Eq. 18.}$$

As illustrated above, the linear spline expansion only ensured continuity of the net load, but not of its derivative. The C' continuity constraint of Eq. 19 (below) may be imposed on the cubic Hermite approximation of the net load (Eq. 18) to ensure continuity of its derivative:

$$N_m^{00}=N_{m-1}^{10}, N_m^{01}=N_{m-1}^{11} \forall m>0 \quad \text{Eq. 19.}$$

The constraint of Eq. 19 implies that there are 2M parameters defining N(t) in the function space of cubic Hermite splines. The cubic Hermite basis functions may be expressed in terms of Bernstein polynomials of degree 3 as follows:

$$H(t)=WB_3(t) \quad \text{Eq. 20.}$$

The change of basis matrix W may be defined as:

$$W=\begin{pmatrix} 1 & 1 & 0 & 0 \\ 0 & \frac{1}{3} & 0 & 0 \\ 0 & 0 & 1 & 1 \\ 0 & 0 & -\frac{1}{3} & 0 \end{pmatrix}. \quad \text{Eq. 21}$$

Using Eq. 20, $\hat{N}(t)$ of Eq. 16 may be expressed in terms of Bernstein polynomials of degree 3 as:

$$\hat{N}(t)=\sum_{m=0}^{M-1} B_3^T(\tau_m)W^T N_m^H=\sum_{m=0}^{M-1} B_3^T(\tau_m)N_m^B. \quad \text{Eq. 22}$$

In Eq. 22, $N_m^B=W^T N_m^H$ may comprise a vector of the coefficients for Bernstein polynomial approximation of the net load in the mth interval. Correspondingly, the continuous-time generation trajectory of PGUs 120A-N over the day-ahead scheduling horizon Ω may be expressed as:

$$G_k(t)=\sum_{m=0}^{M-1} H^T(\tau_m)G_{k,m}^H=\sum_{m=0}^{M-1} B_3^T(\tau_m)G_{k,m}^B. \quad \text{Eq. 23}$$

As shown in Eq. 23, the cubic Hermite spline and the Bernstein polynomial of degree 3 comprise two interchangeable bases for modeling generation trajectory (and/or net load) and, as such, may be used interchangeably in order to, inter alia, enforce different constraints and/or conditions. The continuity property $C^1$ may ensure that only the first two cubic Hermit coefficients (i.e., $G_{k,m}^{00}$ and $G_{k,m}^{01}$) are independent in each interval. These coefficients may represent the value of the generation and ramping of a PGU 120A-N at the beginning point of the interval at time $t_m$. The two coefficients (i.e., $G_{k,m}^{10}$ and $G_{k,n}^{11}$) in each interval are not independent and may be respectively equal to the values of the generation and ramping of the PGU at the beginning point of the subsequent interval ($t_{m+1}$).

As mentioned above, the disclosure is not limited to modeling inter-interval variations of net load and/or generation trajectory by use of Hermite splines and/or Bernstein polynomials. However, the use of Bernstein polynomials of degree 3 may provide several advantages. For instance, derivatives of the Bernstein polynomials of degree n may be expressed as the degree of the polynomial, multiplied by the difference of two Bernstein polynomials of degree n−1. For degree 3, a derivative may be expressed as:

$$B'_{k,3}(t)=3(B_{k-1,2}(t)-B_{k,2}(t)) \quad \text{Eq. 24.}$$

Eq. 24 may be expressed in matrix form as follows:

$$B'_3(t)=KB_2(t) \quad \text{Eq. 25.}$$

$B_2(t)$ may comprise the vector of Bernstein polynomials of degree 2, and K may comprise a linear matrix relating the derivatives of $B_3(t)$ with $B_2(t)$, as follows:

$$K=\begin{pmatrix} -3 & 0 & 0 \\ 3 & -3 & 0 \\ 0 & 3 & -3 \\ 0 & 0 & 3 \end{pmatrix}. \quad \text{Eq. 26}$$

The continuous-time ramping trajectory of a PGU 120A-N k may be defined in a space spanned by Bernstein polynomials of degree 2 as follows:

$$G'_k(t)=\sum_{m=0}^{M-1} B_2^T(\tau_m)G'^B_{k,m}. \quad \text{Eq. 27}$$

In Eq. 27, $G'^B_{k,m}=(G'^{B0}_{k,m},G'^{B1}_{k,m},G'^{B2}_{k,m})^T$ may represent the vector of Bernstein coefficients of the continuous-time ramping trajectory, which can be expressed in terms of cubic Hermite splines as follows:

$$G'^B_{k,m}=K^T G_{k,m}^B=K^T W^T G_{k,m}^H \quad \text{Eq. 28.}$$

In which:

$$G'^{B0}_{k,m}=3(G_{k,m}^{B1}-G_{k,m}^{B0})=G_{k,m}^{01} \quad \text{Eq. 29.}$$

$$G'^{B1}_{k,m}=3(G_{k,m}^{B2}-G_{k,m}^{B1})=3(G_{k,m}^{10}-G_{k,m}^{00})-G_{k,m}^{11}-G_{k,m}^{01} \quad \text{Eq. 30.}$$

$$G'^{B2}_{k,m}=3(G_{k,m}^{B3}-G_{k,m}^{B2})=G_{k,m}^{11}. \quad \text{Eq. 31.}$$

Bernstein polynomials may also satisfy a "convex hull property," such that the continuous-time trajectories will remain within a convex hull formed by four Bernstein points. Accordingly, the lower and upper bounds of the continuous-time generation and ramping trajectories of PGUs 120A-N (defined in PGUGR metadata 157A-N)

within an internal m may be represented by the associated Bernstein coefficients, as follows:

$$\min_{t_m \le t \le t_{m+1}} \{B_3^T(\tau_m) G_{k,m}^B\} \ge \min\{G_{k,m}^B\}. \quad \text{Eq. 32}$$

$$\max_{t_m \le t \le t_{m+1}} \{B_3^T(\tau_m) G_{k,m}^B\} \le \min\{G_{k,m}^B\}. \quad \text{Eq. 33}$$

$$\min_{t_m \le t \le t_{m+1}} \{B_2^T(\tau_m) G_{k,m}'^B\} \ge \min\{G_{k,m}'^B\}. \quad \text{Eq. 34}$$

$$\max_{t_m \le t \le t_{m+1}} \{B_2^T(\tau_m) G_{k,m}'^B\} \le \min\{G_{k,m}'^B\}. \quad \text{Eq. 35}$$

Another advantage of the continuous-time model of generation trajectory using cubic Hermite and Bernstein polynomials as disclosed herein (e.g., per Eq. 23) is a corresponding generation cost function (e.g., Eq. 9) may be accurately computed for continuous-time generation trajectory, as opposed to an hourly constant generation schedule. The auxiliary generation variables $\Gamma_{k,n}(t)$ of the linearized cost function of Eq. 9 may be translated into the cubic Hermite function space, as follows:

$$\Gamma_{k,n}(t) = \sum_{m=0}^{M-1} H^T(\tau_m)\Gamma_{k,n,m}^H. \quad \text{Eq. 36}$$

In Eq. 36, $\Gamma_{k,n,m}$ may comprise a vector of cubic Hermite coefficients, as follows:

$$\Gamma_{k,n,m}^H = (\Gamma_{k,n,m}^{00}, \Gamma_{k,n,m}^{01}, \Gamma_{k,n,m}^{10}, \Gamma_{k,n,m}^{11})^T. \quad \text{Eq. 37.}$$

In the FIG. 6 embodiment, the net load modeler 647 may be configured to express the net load profile 154 as cubic Hermite polynomials, CSRNL 655 (e.g., in accordance with Eq. 16). The respective coefficients $B_m^H$ may flow into a UC modeler 649, which may generate a UC model 660 for the power system 100. The continuous-time generation and ramping trajectories of each PGU 120A-N k may be represented by the coefficients $G_{k,m}^H, G'^B_{k,m}$ defined over M intervals (e.g., hours) of the scheduling horizon Ω (e.g., day). The continuous-time binary commitment variable (decision variable) of a particular PGU 120A-N k, $I_k(t)$ may be constant in each interval m, and as such, the continuous-time piecewise constant representation of the commitment variable k may be expressed as:

$$I_k(t) = \sum_{m=0}^{M-1} I_k(t_m)[u(t-t_m) - u(t-t_{m+1})]. \quad \text{Eq. 38}$$

The coefficients $G_{k,m}^H, G'^B_{k,m}$ and binary variables $I_k(t_m)$ may act as the decision variables of the UC model 660. The optimal solution to the UC model 660 may be utilized to reconstruct the continuous-time generation and ramping trajectories of the PGUs 120A-N (e.g., power generation module, PGM(t) for the power system 100, as disclosed herein).

The manager 646 comprises a UC processor 662 configured to determine an "optimal" power system configuration 160 by, inter alia, determining an optimal solution to the UC model 660, as disclosed herein. The optimal solution to the UC model 660 may correspond to an optimization criterion, such as minimizing the total continuous-time generation cost of power generated during the scheduling horizon Ω (e.g., day), including startup and shutdown costs. The continuous-time generation cost function may be defined in terms of the cubic Hermite coefficients of the auxiliary generation variables $\Gamma_{k,n,m}(t)$, by integrating the linearized cost function of Eq. 9, as follows:

$$\int_\Omega \hat{C}_k(G_k(t), I_k(t))\,dt = \sum_{m=0}^{M-1}\left[C_k(G_k^{min})\int_{t_m}^{t_{m+1}} I_k(t)\,dt + \sum_{n=0}^{N_k-1}\gamma_{k,n}(t_m)(\Gamma_{k,n,m}^H)^T\left[\int_{t_m}^{t_{m+1}} H(\tau_m)\,dt\right]\right]. \quad \text{Eq. 39}$$

In Eq. 39, the cost coefficients $C_k(G_k^{min})$ and $\gamma_{k,n}(t_m)$ may be constant over each interval m. By calculating the integrals per Eq. 39, the objective function of the UC model 660, including the total generation, startup, and shutdown costs, may be expressed as follows:

$$\min \sum_{k=1}^{K}\sum_{M=0}^{M-1}\left[C_k^{SU}(t_m) + C_k^{SD}(t_m) + T_m\left(C_k(G_k^{min})I_k(t_m) + \sum_{n=0}^{N_k-1}\gamma_{k,n}(t_m)\left[\frac{\Gamma_{k,n,m}^{00}+\Gamma_{k,n,m}^{10}}{2} + \frac{\Gamma_{k,n,m}^{01}-\Gamma_{k,n,m}^{11}}{12}\right]\right)\right]. \quad \text{Eq. 40}$$

The startup and shutdown costs of a PGU 120A-N (per Eq. 40) may be triggered when PGUs 120A-N are committed (scheduled) or shutdown, which are respectively identified by the corresponding changes to the binary commitment variable in Eqs. 41 and 42 below. In addition, the bounds of the auxiliary generation variables of Eq. 11 may be translated into constraints on the associated Bernstein coefficients due to, inter alia, the convex hull property of Bernstein polynomials, as disclosed above.

$$\gamma_k^{SU}[I_k(t_m) - I_k(t_{m-1})] \le C_k^{SU}(t_m)\,\forall k, \forall m \quad \text{Eq. 41.}$$

$$\gamma_k^{SD}[I_k(t_{m-1}) - I_k(t_m)] \le C_k^{SD}(t_m)\,\forall k, \forall m \quad \text{Eq. 42.}$$

$$0 \le W^T\Gamma_{k,n,m}^H \le g_{n+1} - g_n\,\forall n, \forall k, \forall m. \quad \text{Eq. 43.}$$

The UC processor 662 may be configured to balance generation and load (in the UC model 660) per Eq. 44 below, which may comprise balancing the four cubic Hermite coefficients of the continuous-time load and generation trajectory in each interval m. Therefore, unlike discrete and/or piecewise linear PGU management in which PGUs 120A-N are scheduled to balance hourly samples of net load, the manager 646 is configured to schedule the continuous-time generation trajectory (per Eq. 44) to balance the continuous-time variations and ramping of load within the intervals m, as represented by the cubic Hermite spline model. In addition, the UC processor 662 may enforce the constraints of Eq. 45 (below) to ensure e continuity of the generation trajectory over the scheduling horizon Ω. In Eq. 46 (below), the Bernstein coefficient of the continuous-time generation trajectory of generating units is expressed in terms of the coefficients of the auxiliary generation variables, where $I_{k,m}=(I_k(t_m), I_k(t_m), I_k(t_{m+1}), I_k(t_{m+1}))^T$ is the vector of applicable binary variables. In Eq. 46, the first two cubic Hermite coefficients of generation variables may be associated with the commitment status of PGUs 120A-N in interval m, while the last two coefficients are associated with the commitment status of PGUs 120A-N in interval m+1.

$$\sum_{k=1}^{K} G_{k,m}^{H} = N_m^H \ \forall m. \qquad \text{Eq. 44}$$

$$G_{k,m}^{10} = G_{k,m+1}^{00},\ G_{k,m}^{11} = G_{k,m+1}^{01} \ \forall k, \forall m. \qquad \text{Eq. 45}$$

$$W^T G_{k,m}^{H} = G_k^{min} I_{k,m} + \sum_{n=0}^{N_k-1} W^T \Gamma_{k,n,m}^{H}. \qquad \text{Eq. 46}$$

The UC processor 662 may leverage the convex hull property of Bernstein polynomials to enforce generation capacity constrains in continuous-time by capping the four Bernstein coefficients of the generation trajectory as follows:

$$W^T G_{k,m}{}^{H} \geq G_k{}^{min} I_{k,m} \forall k, \forall m \qquad \text{Eq. 47.}$$

$$W^T G_{k,m}{}^{H} \leq G_k{}^{max} I_{k,m} \forall k, \forall m. \qquad \text{Eq. 48.}$$

The UC processor 662 may be configured to apply continuous-time ramping constraints in a similar manner by capping the Bernstein coefficients of the continuous-time ramping trajectory of PGUs 120A-N derived in Eqs. 29-31, only two of which are independent in each interval m due to the ramping continuity constraint of Eq. 45. The ramping up and down constraints for the first Bernstein coefficient of generation ramping trajectory (which may also account for the startup and shutdown ramp rates) may be defined as:

$$G'_{k,m}{}^{B0} \leq R_k{}^{U} I_k(t_{m-1}) + R_k{}^{SU}[I_k(t_m) - I_k(t_{m-1})] + G_k{}^{max}[1 - I_k(t_m)] \forall k, \forall m \qquad \text{Eq. 49.}$$

$$-G'_{k,m}{}^{B0} \leq R_k{}^{D} I_k(t_m) + R_k{}^{SD}[I_k(t_{m-1}) - I_k(t_m)] + G_k{}^{max}[1 - I_k(t_{m-1})] \forall k, \forall m \qquad \text{Eq. 50.}$$

In Eqs. 49 and 50, $R_k^{U}$, $R_k^{D}$, $R_k^{SU}$, $R_k^{SD}$ may represent ramp up, ramp down, startup ramp, and shutdown ramp limits of a PGU 120A-N k. The ramping up and down constraints for the second Bernstein coefficient of generation ramping trajectory may be defined as:

$$G'_{k,m}{}^{B1} \leq R_k{}^{U} I_k(t_m) \forall k, \forall m = 0 \ldots M-2 - G'_{k,m}{}^{B1} \leq R_k{}^{D} I_k(t_m) + \eta[1 - I_k(t_{m+1})] \qquad \text{Eq. 51.}$$

$$\forall k, \forall m = 0 \ldots M-2 \qquad \text{Eq. 52.}$$

In Eqs. 51 and 52, η may be a constant equal to the upper bound of $G'_{k,m}{}^{B1}$ in interval m when the PGU 120A-N k is offline in interval m+1. The second term of Eq. 52 may ensure that the constraint does not prevent the PGU 120A-N from turning off.

The UC processor 662 may be further configured to formulate minimum off time constraints for the UC model 660, as follows:

$$\sum_{m'=m}^{m+T_k^{on}-1} T_{m'} I_k(t_{m'}) \geq T_k^{on}[I_k(t_m) - I_k(t_{m-1})]. \qquad \text{Eq. 53}$$

$$\sum_{m'=m}^{m+T_k^{off}-1} T_{m'} [1 - I_k(t_{m'})] \geq T_k^{off}[I_k(t_{m-1}) - I_k(t_m)]. \qquad \text{Eq. 54}$$

The UC processor 662 may configure $T_k^{on}$ and $T_k^{off}$ to represent minimum on and off times of a PGU 120A-N k. The manager 646 (by use of the net load modeler 647 and UC modeler 649) may formulate a UC model 660 for the power system 100 according to Eqs. 40-54, which may comprise a UC model with continuous-time generation and ramping trajectory. The UC processor 662 may process the UC model 660 according to an optimization criterion (and/or cost characteristics) to determining the optimal power system configuration 160 for the power system 100 during the operating period. As disclosed above, the power system configuration 160 may balance the continuous-time variations and ramping of load within intervals (e.g., inter-interval variations) by, inter alia, modeling net load and ramping characteristics as cubic splines. The increased accuracy of the net load and/or generation trajectory may improve the performance of the power system 100 during real-time operation by, inter alia, more closely scheduling PGUs 120A-N to satisfy real-time load and/or ramping characteristics.

Figure 7:
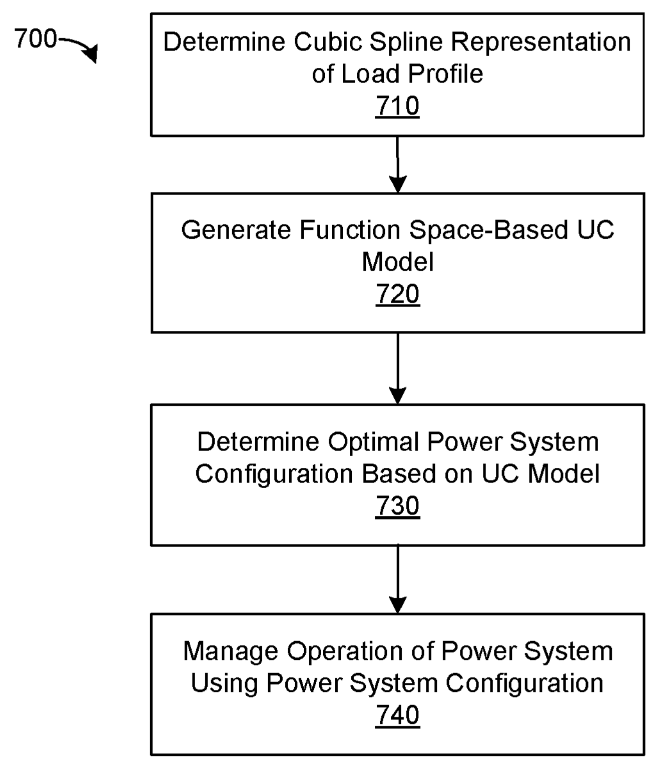
FIG. 7 is a flow diagram of another embodiment of a method for managing a power system.

FIG. 7 is a flow diagram of another embodiment of a method 700 for managing a power system. Step 710 may comprise determining a cubic spline representation of a load profile 154 (a CSRNL 655), as disclosed herein. Step 720 may comprise generating a UC model 660 corresponding to the CSRNL 655, which may comprise incorporating PGU metadata 156A-N, generation and/or ramping trajectory of the PGUs 120A-N (PGUGR metadata 157A-N), and so on. Step 730 may comprise determining an optimal power system configuration based on the UC model of step 720, as disclosed herein. Step 740 may comprise managing operation of the power system 100 during real-time operations in accordance with the optimal power system configured determined at step 730.

Figure 8:
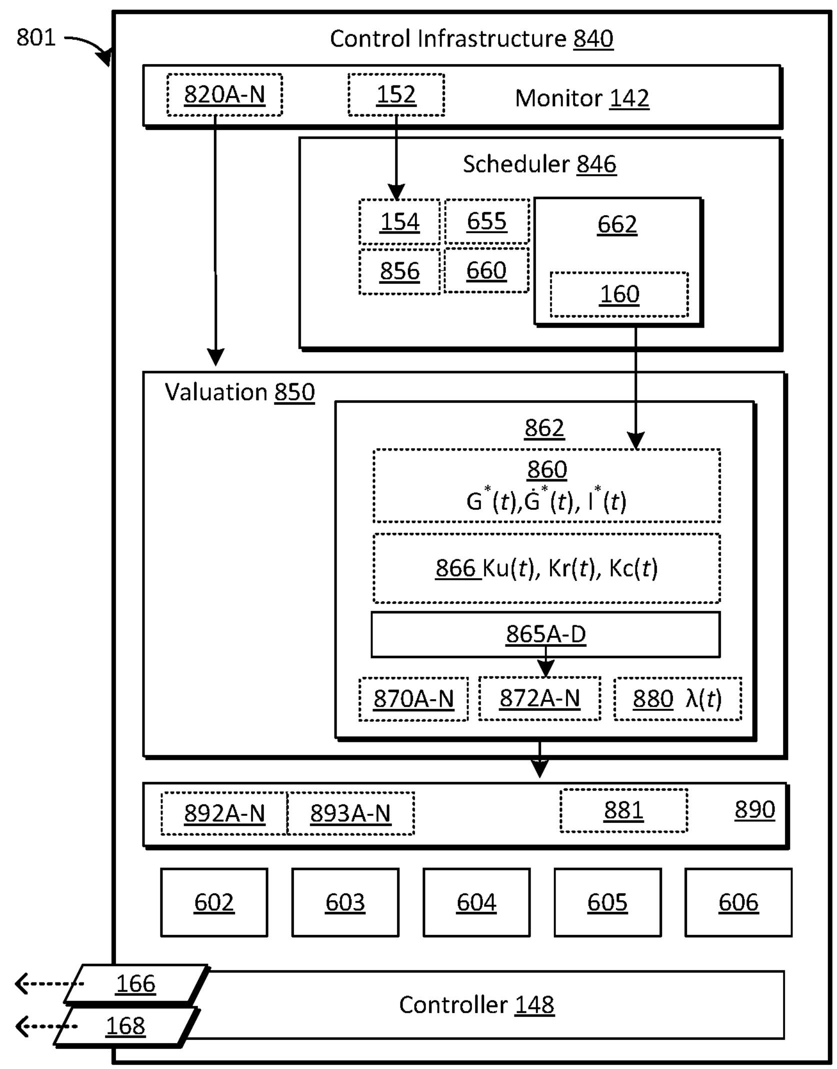
FIG. 8 depicts one embodiment of control infrastructure for comprising a valuation manager configured to determine valuation metrics for power generated for the power system.

FIG. 8 is a schematic block diagram of an embodiment of control infrastructure 840 for a power system 100 and/or PGU 120. The control infrastructure 840 may comprise and/or be embodied within a computing device 801, such as an MCCD. The control infrastructure 840 may, therefore, comprise processing resources 602, memory resources 603, non-transitory storage resources 604, communication resources 605, HMI components 606, and so on, as disclosed herein.

The control infrastructure 840 may comprise a valuation manager 850, which may be configured to determine a marginal valuation metric 880 for power generated for the power system 100 by the PGUs 120A-N. The marginal valuation metric 880 may comprise a continuous-time valuation metric 880 quantifying a value of power generated for the power system 100 during an operating interval T. The marginal valuation metric 880 may incorporate costs associated with the ramping trajectories of the PGU 120A-N as opposed to only the power generated thereby (as in conventional valuation approaches). The valuation manager 850 may be further configured to determine respective incremental generation cost metrics 870A-N and/or incremental ramping cost metrics 872A-N for each PGU 120A-N. In some embodiments, the valuation manager 850 may be embodied within the control infrastructure of a particular PGU 120A-N. The valuation manager 850 may be configured to coordinate with one or more PGU 120A-N and/or power systems 100 to determine valuation for power generation during particular times and/or particular power system configurations 160 (e.g., based on the determined, continuous-time marginal valuation metric). The valuation manager 850 may be further configured to use the determined continuous-time valuation metrics and/or incremental generation and/or ramping cost metrics of the PGUs 120A-N to schedule power generation resources for the power system 100, coordinate with the PGUs 120A-N selected to provide power to the power system 100 during particular time periods (e.g., in accordance with a particular PGU configuration 162), compensate for real-time load variations, and/or the like.

In some embodiments, determining a continuous-time marginal valuation metric comprises assigning an economic value to power generated for the power system 100 (and/or power scheduled to be generated for the power system during a particular operating interval T). The economic value assigned to power generated by the PGUs 120A-N should reflect the actual marginal cost incurred by the PGUs 120A-N. The economic value assigned to power generated by a PGU 120A-N may be used to, inter alia, schedule power system resources for the power system 100, account for the resources and/or costs of power generation by the PGU 120A-N (e.g., assign a price to the power generated by the PGU 120A-N), and so on.

As disclosed above, conventional approaches to power system scheduling and valuation are based on discrete time models (e.g., discrete time UC formulations), which may not be capable of adequately modeling sub-interval characteristics of the power system 100 and, in particular, may not adequately model load and/or generation ramping constraints. As disclosed above, inadequate modeling of ramping constraints may render the power system 100 susceptible to scarcity events, and may lead to inaccuracies in power valuation. Conventional approaches model ramping using discrete-time modeling techniques (e.g., as a finite difference between discrete-time power samples). As illustrated herein, discrete-time approaches cannot adequately model the impact of load ramping, or PGU ramping constraints, resulting in sub-optimal PGU scheduling and valuation. A continuous-time UC model 660 may improve the performance of the power system 100 by, inter alia, a) modeling sub-interval variations in net load on the power system, and b) scheduling PGUs 120 to satisfy the net load in accordance with continuous-time generation and ramping characteristics thereof. As disclosed in further detail herein, the disclosed continuous-time modeling techniques may be used to determine a marginal valuation metric 880 for power generated by the PGUs 120A-N during a particular operating period T (and/or real-time operation). The marginal valuation metric 880 may be configured to model costs associated with ramping (e.g., ramping due to PGU scheduling and/or load variations), rather than quantifying valuation based on generation trajectory alone. As such, the marginal valuation metric 880 disclosed herein may compensate PGUs 120A-N for costs associated with a continuous-time ramping trajectory, which may better reflect real-world costs incurred by the PGUs 120A-N (and reduce or eliminate the need for uplift). Furthermore, the marginal valuation metric 880 disclosed herein may merit PGUs 120A-N based on their ramping capabilities, which may enable the power system 100 to select (and incentivize) PGUs 120A-N to develop ramping capabilities needed to compensate for net-load variations (and reduce the likelihood of scarcity events). In addition, incremental generation and ramping cost metrics 870A-N and 872A-N for the PGUs 120A-N may be determined, which may be used in selecting PGUs 120A-N to satisfy load variations during real-time operations. Furthermore, quantifying the generation and ramping cost metrics of the PGUs 120A-N may enable the power system 100 to optimally select PGUs 120A-N with similar generation cost characteristics based on differences in the ramping costs thereof.

In FIG. 8, the control infrastructure 840 may comprise a scheduler 846, which may be configured to determine an optimal power system configuration 160 for the power system 100 as disclosed herein. The scheduler 846 may be configured to: determine a continuous-time load profile for the power system 100, generate a continuous-time UC model 660 for the power system 100 (based on characteristics of the power system infrastructure 110, PGUs 120A-N, and so on), and determine an optimal solution to the UC model 660 (e.g., determine optimal generation and ramping trajectories for the PGUs 120A-N to satisfy the net load forecast for the power system 100 at minimum cost). The continuous-time UC model 660 may be a computationally intractable variational problem. As such, the scheduler 846 may determine an optimal solution to the UC model 660 by recasting the UC model 660 as an MILP problem with a finite-dimensional decision space (e.g., utilizing Bernstein polynomials to model the continuous-time generation and/or ramping trajectories of the PGU 120A-N, as disclosed herein). The solution to the MILP problem may comprise a power system configuration 160, which may define an optimal set of continuous-time generation trajectories G*(t), continuous-time ramping trajectories G*(t), and binary commitment values I*(t) for each PGU 120A-N to satisfy the net load forecast for the power system at minimum cost.

The continuous-time ramping trajectory of a PGU 120A-N may comprise a time derivative of the corresponding generation trajectory 822A-N for PGU $G_k$, as follows:

$$\dot{G}_k(t) \triangleq \lim_{\Delta t \to 0} \frac{G_k(t_{n+1}) - G_k(t_n)}{\Delta t} = \frac{dG_k(t)}{dt}. \quad \text{Eq. 55}$$

The valuation manager 850 may use the optimal generation and ramping trajectories determined by the scheduler 846 to determine the marginal valuation metric 880 for the power generated by the PGUs 120A-N. The determined marginal valuation metric 880 may quantify costs incurred by the PGU 120A-N due to both generation trajectory and ramping trajectory (rather than generation alone as in conventional, discrete-time approaches to valuation). In some embodiments, the valuation manager 850 defines a cost function $C_k(G_k(t), \dot{G}k(t))$ for the PGUs 120A-N that is based on both generation trajectory $G_k(t)$ and ramping trajectory $\dot{G}k(t)$. A PGU 120A-N may, therefore, more accurately reflect the costs associated with a particular PGU schedule. Costs associated with generation and/or ramping of particular PGUs 120A-N may be specified in PGU metadata 856, which may be incorporated into the optimal solution to the UC model 660, as disclosed above. By way of non-limiting example, a particular PGU 120A may incur different ramping costs than other PGUs 120B-N. The different ramping costs may be due to physical characteristics of the PGU 120A, wear characteristics, and/or the like. The valuation manager 850 may adapt the cost function to reflect the particular ramping costs of each PGU 120A-N, including the PGU 120A. The ramping costs may be reflected in the marginal valuation metric 880 as well as the incremental generation and/or ramping cost metrics 870A-N and 872A-N.

The continuous-time UC model 660 disclosed herein may quantify costs associated with the continuous-time generation trajectory $G_k(t)$ and continuous-time ramping trajectory $\dot{G}k(t)$ of each PGUs 120A-N ($G_k$). As disclosed above, the UC model 660 may be formulated as follows:

$$\min_{G(t),I(t)} \int_T \left(C\left(G(t), \dot{G}(t)\right) + C^I(I(t))\right) dt, \quad \text{Eq. 56}$$

-continued $$\text{s.t. } f(G(t), I(t)) = 0, (\lambda(t)), t \in \tau, \qquad \text{Eq. 57}$$

$$h(G(t), \dot{G}(t), I(t)) \le 0, (\gamma(t)), t \in \tau, \qquad \text{Eq. 58}$$

In Eq. 56, the cost function $C(G(t), G(t))$ comprises a sum of the cost function of each PGU 120A-N (e.g., a sum of $C_k(G_k(t), \dot{G}_k(t))$, where k is a PGU 120A-N). The $\lambda(t)$ and $\gamma(t)$ functions comprise continuous-time Lagrange multiplier trajectories associated with the continuous-time equality and inequality constraints of Eqs. 57 and 58, respectively. The UC model 660 formulated in accordance with Eqs. 56-58 may provide for flexibly scheduling PGU 120A-N to balance a continuous-time net-load over an operating period T. However, an optimal solution to the continuous-time UC formulation of Eqs. 56-58 may be difficult to compute (the UC model 660 of Eqs. 56-58 is an infinite dimensional computationally intractable variational problem). In some embodiments, and as disclosed herein, the scheduler 846 may determine an optimal solution to the UC model 660 of Eqs. 56-58 by, inter alia, recasting the system as a MILP problem with a finite-dimensional space (e.g., by use of the spline function space of Bernstein polynomials). In this approach, the coefficients of projecting the continuous-time trajectories in the function space of Bernstein polynomials represent the decision variables of the resulting MILP system. A solution to the optimization problem may, therefore, be calculated to produce, inter alia, a PGU configuration 162 comprising an optimal scheduling for the PGUs 120A-N during the operating period T (e.g., optimal generation, ramping, and commitment, $G^*(t)$, $\dot{G}^*(t)$, $I^*(t)$).

The valuation manager 850 may leverage the solution to the UC model 660 produced by the scheduler 846 to formulate the continuous-time marginal valuation metric 880. In some embodiments, the valuation manager 850 comprises a valuation processor 862, which may be configured to, inter alia, formulate a valuation model 860 corresponding to the power system configuration 160. The valuation processor 862 may formulate the valuation model 860 by fixing the binary variables of the continuous-time UC model 660 to their optimal values ($I^*(t)$), and defining a corresponding optimization problem, as follows:

$$\min_{G(t)} J(G(t)) = \int_{\tau} C(G(t), \dot{G}(t)) dt, \qquad \text{Eq. 59}$$

$$\text{s.t. } 1^T G(t) = D(t), (\lambda(t)), t \in \tau, \qquad \text{Eq. 60}$$

$$\underline{G}(t) \le G(t) \le \overline{G}(t), (\underline{\upsilon}(t), \overline{\upsilon}(t)), t \in \tau, \qquad \text{Eq. 61}$$

$$\underline{\dot{G}}(t) \le \dot{G}(t) \le \overline{\dot{G}}(t), (\underline{\mu}(t), \mu(t)), t \in \tau, \qquad \text{Eq. 62}$$

$$G(0) = G^0. \qquad \text{Eq. 63}$$

In Eqs. 59-63, $\underline{G}(t)=(\underline{G}_1(t)I_1^*, \ldots, \underline{G}_k I_1^*(t))^T$ and $\overline{G}(t)=(\overline{G}_1(t)I_1^*, \ldots, \overline{G}_k I_1^*(t))^T$ may comprise continuous-time lower and upper capacity bounds of the PGU 120A-N, with $\underline{G}_k$ and $\overline{G}_k$ representing minimum and maximum capacities of a particular PGU 120A-N ($G_k$). The continuous-time lower and upper ramping bounds may be $\underline{\dot{G}}(t)=(\underline{\dot{G}}_1(t) I_1^*, \ldots, \underline{\dot{G}}_k I_1^*(t))^T$ and $\overline{\dot{G}}(t)=(\overline{\dot{G}}_1(t)I_1^*, \ldots, \overline{\dot{G}}_k I_1^*(t))^T$ of the PGUs 120A-N, with $\underline{\dot{G}}_k$ and $\overline{\dot{G}}_k$ being the lower and upper ramping bounds of a particular PGU 120A-N ($G_k$). Note, since the integer values are fixed in the formulation above, the cost term $C^I(I^*(t))$ of Eq. 56 becomes a constant, and the minimum on/off constraints are rendered redundant and, as such, are not included in the objective function of Eq. 59.

The optimization problem defined in Eqs. 59-63 is a constrained variational problem, where Eq. 59 represents the objective function to be minimized over T. The continuous-time power balance constraint is formulated in Eq. 60, and Eqs. 61 and 62 confine the generation and ramping trajectories between their minimum and maximum limits over the scheduling horizon for the power system 100. The vector of the generation trajectories at time zero ($G(0)$) may be set to the vector of initial values ($G^0$) in Eq. 63. The valuation processor 862 may configure the constraints of Eqs. 60-63 such that the constraints are enforced in every instant of time over the scheduling horizon T The constraints of Eqs. 60-63 may, therefore, be referred to as variational constraints. Accordingly, the corresponding Lagrange multipliers $\lambda(t)$, $\underline{\upsilon}(t)$, $\overline{\upsilon}(t)$, $\underline{\mu}(t)$, and $\overline{\mu}(t)$ of Eqs. 60-62 also comprise continuous-time trajectories defined over the scheduling horizon T.

The valuation processor 862 may be further configured to derive a set of optimality conditions 865 for the valuation model 860 of Eqs. 59-63. The optimality conditions 865 may be predicated on characteristics of the power system 100 and/or PGU 120A-N, such as: (1) generation trajectories G(t) of the PGU 120A-N are continuously differentiable functions of t (are $C^1$); (2) the cost functions of the PGUs 120A-N are independent of each other; (3) the cost functions of the PGU 120A-N are $C^1$ and are monotonically increasing convex functions of their arguments; and (4) the cost functions of the PGU 120A-N are not explicit functions of t. The implication of characteristic (1) is that the inertia of physical components of the respective PGUs 120A-N preclude abrupt, discontinuous changes in the generation trajectory thereof (ensuring that the power generation trajectory G(t) is continuous over time). Moreover, the approach to arrive at the optimal solution for $G^*(t)$ ensures that these functions are $C^1$ within upper and lower bounds over the operating period T, including startup and shutdown.

The Lagrangian associated with the variational problem of determining an optimal solution to the valuation model 860 (as defined by Eqs. 59-63) may be formed as follows:

$$\mathcal{L}(G(t),\dot{G}(t),\lambda(t),\underline{\upsilon}(t),\overline{\upsilon}(t),\underline{\mu}(t),\overline{\mu}(t))=c(G(t),\dot{G}(t))+\lambda(t)(D(t)-1^T G(t))+\underline{\upsilon}^T(t)(\underline{G}(t)-G(t))+\overline{\upsilon}^T(t)(G(t)-\overline{G}(t))+\underline{\mu}^T(t)(\underline{\dot{G}}(t)-\dot{G}(t))+\overline{\mu}^T(t)(\dot{G}(t)-\overline{\dot{G}}(t)). \qquad \text{Eq. 64.}$$

As disclosed above, the valuation processor 862 may be configured to determine optimality conditions 865 for the valuation model 860. The optimality conditions 865 may comprise Euler-Lagrange conditions 865A. In accordance with the Euler-Lagrange conditions 865A, an optimal solution for the generation trajectories $G^*(t)$ (generation trajectories 822A-N) may be required to solve the Euler-Lagrange equation below:

$$\frac{\partial \mathcal{L}}{\partial x(t)} - \frac{d}{dt}\frac{\partial \mathcal{L}}{\partial \dot{x}(t)} = 0. \qquad \text{Eq. 65}$$

Solving Eq. 65 may comprise calculating for $$\frac{\partial \mathcal{L}}{\partial G(t)} \text{ and } \frac{d}{dt}\frac{\partial \mathcal{L}}{\partial \dot{G}(t)}$$

Eq. 64 as follows:

$$\frac{\partial C(G(t),\dot{G}(t))}{\partial G(t)}-\frac{d}{dt}\left(\frac{\partial C(G(t),\dot{G}(t))}{\partial \dot{G}(t)}\right)-\lambda(t)1-\underline{\upsilon}(t)+\overline{\upsilon}(t)+\underline{\mu}(t)-\overline{\mu}(t)=0. \qquad \text{Eq. 68}$$

Using Eqs. 66 and 67, the Euler-Lagrange equations may be derived as:

$$\frac{\partial \mathcal{L}}{\partial G(t)}=\frac{\partial C(G(t),\dot{G}(t))}{\partial G(t)}-\lambda(t)1-\underline{\upsilon}(t)+\overline{\upsilon}(t), \qquad \text{Eq. 66}$$

$$\frac{d}{dt}\frac{\partial \mathcal{L}}{\partial \dot{G}(t)}=\frac{d}{dt}\left(\frac{\partial C(G(t),\dot{G}(t))}{\partial \dot{G}(t)}\right)-\underline{\mu}(t)+\overline{\mu}(t). \qquad \text{Eq. 67}$$

Eq. 68 of the Euler-Lagrange condition 865A may represent the first-order necessary condition for local optimum of variational problems (e.g., the variational problem of optimizing the valuation model 860 of Eqs. 59-63). The Eq. 68 of the Euler-Lagrange condition 865A may represent a set of K differential equations that are to be solved over the scheduling horizon T in order to calculate optimal generation trajectories G*(t) 822A-N (and the Lagrange multiplier trajectories). A solution for the K Euler-Lagrange Eq. 68 would require 2K boundary values. The first K boundary values may be provided by the initial values for the generation trajectories G(t) in Eq. 63, and the second K boundary values may be set according to the transversality conditions 865B included in the optimality conditions 865 defined by the PGM manager 870.

Generation trajectories G(t) for the PGUs 120A-N of the power system 100 may be free-ended, meaning that there may not be any specific boundary value condition that must be met at the end of the scheduling horizon T As such, the valuation processor 862 defines transversality conditions 865B, which may comprise requiring the optimal generation trajectories G*(t) to satisfy Eq. 69 below:

$$\left.\frac{\partial \mathcal{L}}{\partial \dot{G}(t)}\right|_{t=T}=0. \qquad \text{Eq. 69}$$

The valuation processor 862 may further specify complimentary slackness conditions 865C for the optimality conditions 865. The inequality constraints of Eqs. 61 and 62 may be configured to satisfy the complimentary slackness conditions 865C, as defined below:

$$\underline{\upsilon}_k(t)(\underline{G}_k(t)-G_k(t))=0,\underline{\upsilon}_k(t)\geq 0,\forall k,\forall t\in\tau, \qquad \text{Eq. 70.}$$

$$\overline{\upsilon}_k(t)(G_k(t)-\overline{G}_k(t))=0,\overline{\upsilon}_k(t)\geq 0,\forall k,\forall t\in\tau, \qquad \text{Eq. 71.}$$

$$\underline{\mu}_k(t)(\underline{\dot{G}}_k(t)-\dot{G}_k(t))=0,\underline{\mu}_k(t)\geq 0,\forall k,\forall t\in\tau, \qquad \text{Eq. 72.}$$

$$\overline{\mu}_k(t)(\dot{G}_k(t)-\overline{\dot{G}}_k(t))=0,\overline{\mu}_k(t)\geq 0,\forall k,\forall t\in\tau, \qquad \text{Eq. 73.}$$

The valuation engine 862 may enforce the complimentary slackness conditions 865C to ensure that the Lagrange multiplier associated with an inequality constraint is either zero (when the constraint is not binding) or is a non-negative number (when the constraint is binding).

The valuation processor 862 may further define original problem constraints 865D for optimization of the valuation model 860. The original problem constraints 865D may require that the optimal trajectories G*(t) and Ġ*(t) (and corresponding binary commitment values I*(t)) satisfy each of the constraints 865A-C. Furthermore, the original problem constraints 865D may provide the sufficient condition that the optimal generation and ramping trajectories comprise a globally optimal solution to Eqs. 59-63.

Based on the foregoing, the valuation processor 862 may be configured to determine the marginal valuation metric 880 for power generated during the operating period T as the rate at which the objective functional is changed due to an incremental change in load at time t (e.g., the optimal Lagrange multiplier trajectory λ(t) of the power balance constraint of Eq. 60).

By way of non-limiting example, assume that G*(t) and J(G*(t)) are the optimal generation trajectories and optimal objective functional values of Eqs. 59-63. The corresponding optimal Lagrange multiplier trajectory λ(t) associated with the variational power balance constraint of Eq. 60 may quantify the rate at which the objective functional J is changed due to an incremental change in load at time t. The optimal Lagrange multiplier trajectory λ(t) may quantify a cost associated with supplying incremental load variations at a time t during the operating interval T of the power system 100. The optimal Lagrange multiplier trajectory λ(t) may, therefore, quantify the marginal value of power generation and, as such, may comprise the marginal valuation metric 880 for the power system 100.

The optimal Lagrange multiplier trajectory λ(t) may be established as a continuous-time marginal valuation metric 880 as set forth below. Let D(t) be incremented by a infinitesimally small and localized $C^1$ trajectory, δD(t), which takes positive values in (τ, τ+δt) and vanishes to zero at t=τ and t=τ+δt, where τ is within the operating interval T. This incremental variation is sufficiently small that an optimal solution still exists and involves the same binding inequality constraints, i.e., the incremental load variation δD(t) results in an incremental change to the optimal trajectories G*(t) and Ġ*(t), the operation costs C(G(t), Ġ(t)), and the total objective functional J. Thus, the optimal value of the objective functional may be expressed as a continuously differentiable function of load trajectory, J*(D(t)). The rate of change to J*≡J*(D(t)) due to the load variation δD(t) may be calculated as follows:

$$\begin{aligned}\Delta J^* &= J^*(D(t)+\delta D(t))-J^*(D(t)) \\ &= \frac{\partial J^*(D(t))}{\partial D(t)}\delta D(t)+O(\|\delta D(t)\|).\end{aligned} \qquad \text{Eq. 74}$$

Wherein ||δD(t)|| is the $L_\infty$ norm of δD(t), and O(||δD(t)||) denotes its higher order functions that tend to zero faster than ||δD(t)||. This term may be substituted with $$J^*(D(t))=\int_\tau \mathcal{L}dt,$$

in Eq. 75 below (where the Lagrangian is defined in Eq. 64):

$$\Delta J^*=\int_\tau \frac{\partial C(G(t),\dot{G}(t))}{\partial D(t)}+\lambda(t)-\lambda(t)\ 1^T\frac{\partial G(t)}{\partial D(t)}+ \qquad \text{Eq. 75}$$

-continued $$\left.(\overline{\upsilon}(t)-\underline{\upsilon}(t))^T\frac{\partial G(t)}{\partial D(t)}+(\mu(t)0\mu(t))^T\frac{\partial \dot{G}(t)}{\partial D(t)}\right)\delta D(t)dt.$$

Applying the total derivative to the first term of Eq. 75, and rearranging the terms results in:

$$\Delta J^* = \int_\tau\left(\left[\frac{\partial C(G(t),\dot{G}(t))}{\partial G(t)}-\lambda(t)1+\overline{\upsilon}(t)-\underline{\upsilon}(t)\right]^T\frac{\partial G(t)}{\partial D(t)}+\left[\frac{\partial C(G(t),\dot{G}(t))}{\partial \dot{G}(t)}+\overline{\mu}(t)-\underline{\mu}(t)\right]^T\frac{\partial \dot{G}(t)}{\partial D(t)}+\lambda(t)\right)\delta D(t)dt. \quad \text{Eq. 76}$$

The incremental load trajectory δD(t), which takes positive values in (τ, τ+δt) and equals zero in [0, τ] U [τ, δt,T]. Thus, δD(t) uniformly tends to ||δD(t)|| in (τ, τ+δt) when ||δD(t)|| is sufficiently small. Using the integration by parts, changing the limits of the integral, and removing ||δD(t)|| therefrom, results in:

$$\Delta J^* = \|\delta D(t)\|\int_\tau^{\tau+\delta t}\left(\lambda(t)+\left[\frac{\partial C(G(t),\dot{G}(t))}{\partial G(t)}-\lambda(t)1+\overline{\upsilon}(t)-\overline{\upsilon}(t)-\frac{d}{dt}\left(\frac{\partial C(G(t),\dot{G}(t))}{\partial \dot{G}(t)}+\overline{\mu}(t)-\underline{\mu}(t)\right)\right]^T\frac{\partial G(t)}{\partial D(t)}\right)dt+\left(\frac{\partial C(G(t),\dot{G}(t))}{\partial \dot{G}(t)}+\overline{\mu}(t)-\underline{\mu}(t)\right)^T\frac{\partial G(t)}{\partial D(t)}\Bigg|_{t=\tau}^{t=\tau+\delta t}\|\delta D(t)\|. \quad \text{Eq. 77}$$

The second term in the right hand side integral in Eq. 77 repeats the Euler-Lagrange Eq. 67 and thus is zero. The last term also goes to zero when ||δD(t)|| tends to zero. Thus, Eq. 77 becomes:

$$\Delta J^*=\|\delta D(t)\|\textstyle\int_\tau^{\tau+\delta\tau}\lambda(t)dt=\lambda(\tau)\|\delta D(t)\|\delta t. \quad \text{Eq. 78.}$$

Dividing Eq. 78 by the product of ||δD(t)|| and δt and taking the limits thereof establishes equivalence with λ(τ), $$\lim_{\substack{\delta t\to 0\\ \|\delta D(t)\|\to 0}}\frac{\Delta J^*}{\|\delta D(t)\|\delta t}=\lim_{\delta t\to 0}\frac{\delta J^*}{\delta t}=\lambda(\tau),$$

where δJ* is the first variation to the optimal objective function with respect to the incremental variation in load, and $$\delta J^*=\lim_{\|\delta D(t)\|\to 0}\frac{\Delta J^*}{\|\delta D(t)\|}.$$

Based on the foregoing, it is established that the valuation metric 880 (λ(t)) represents a cost metric for supplying the incremental load variation to the power system 100 at time t.

The marginal valuation metric 880 may be calculated based on characteristics of the PGUs 120A-N and/or the optimal generation, ramping, and commitment trajectories of the PGUs 120A-N (as incorporated into the valuation model 860 in Eqs. 59-63), and, in particular, to which PGUs 120A-N are Unconstrained, Ramp-constrained, and/or Capacity constrained at various times during the operating period T, as set forth in further detail below.

Figure 9:
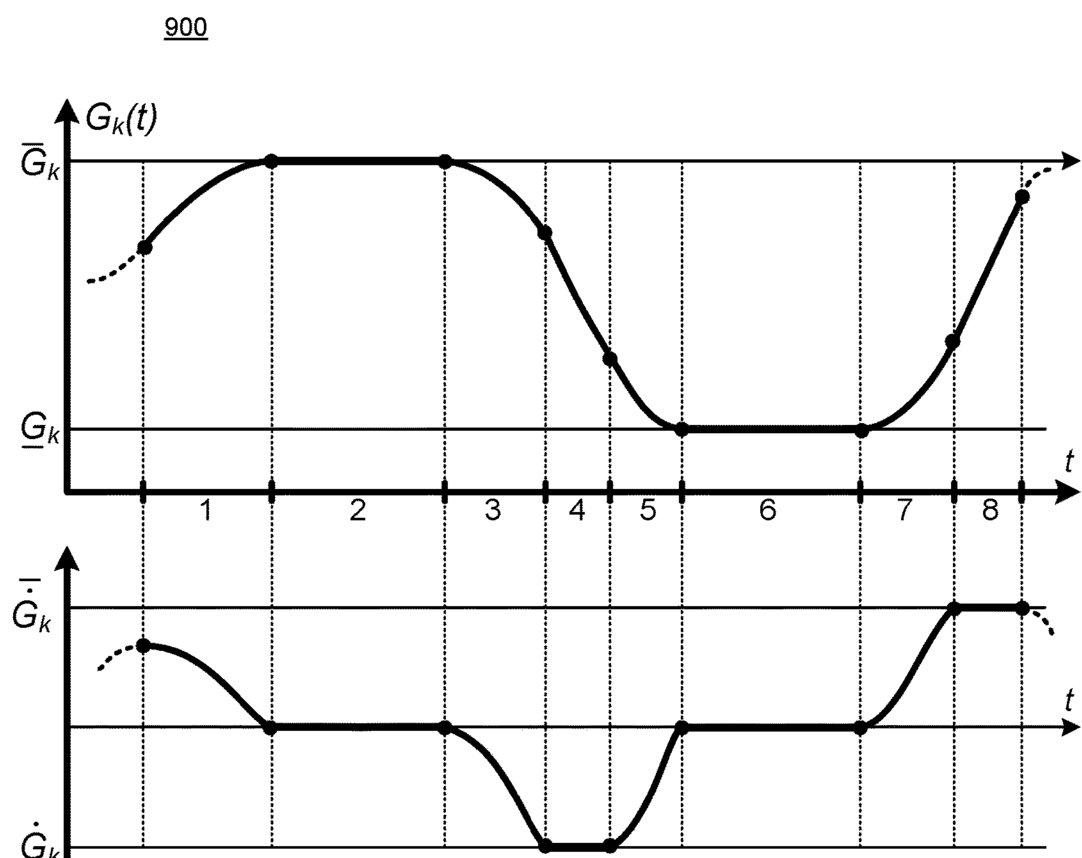
FIG. 9 depicts exemplary plots of a generation and ramping trajectory of a power generating unit.

FIG. 9 is a plot 900 that depicts an exemplary PGU generation trajectory 901 and exemplary PGU ramping trajectory 902. At each time t, the PGUs 120A-N may be classified as one of: (a) Unconstrained, (b) Ramp-constrained, and (c) Capacity constrained. A PGU 120A-N may be classified as Unconstrained at time t if the PGU 120A-N is capable of changing its generation and/or ramping trajectory at time t (e.g., the PGU 120A-N is not operating at its generation and/or ramping capacity). FIG. 9 depicts unconstrained operation of a PGU 120A-N during time periods 1, 3, 5, and 7 (during which the PGU 120A-N is capable of modifying both its generation and ramping trajectory). According to the complimentary slackness conditions 883C (as defined in Eqs. 70-73), the multipliers $\underline{\upsilon}(t)$, $\overline{\upsilon}(t)$, $\underline{\mu}(t)$, and $\overline{\mu}(t)$ are zero for PGU 120A-N that are Unconstrained. The PGUs 120A-N that are classified as being Unconstrained may be included in a time-varying set $K_t^u \equiv K^u(t)$.

A PGU 120A-N may be classified as Ramp-constrained at time t if the PGU 120A-N is subject to binding ramping constraints (either up or down) at time t. A binding ramping constraint refers to a condition in which the PGU 120A-N is capable of changing its generation trajectory at a constant limited down/up ramp rate, but cannot modify its ramping trajectory. FIG. 9 depicts operation of a PGU 120A-N under binding ramping constraints during time periods 4 and 8. According to the complimentary slackness conditions 883C (as defined in Eqs. 70-73), one of more of the multipliers $\underline{\mu}(t)$ and $\overline{\mu}(t)$ are non-negative numbers for PGU 120A-N that are Ramp-constrained. The PGUs 120A-N of the power system 100 that are classified as being Ramp-constrained may be included in a time-varying set $K_t^r \equiv K^r(t)$.

A PGU 120A-N may be classified as Capacity-constrained at time t if the PGU 120A-N is operating under binding maximum/minimum capacity constraints at time t. Binding maximum/minimum capacity constraints may prevent the PGU 120A-N from increasing/decreasing the power being generated thereby. FIG. 9 depicts operation of a PGU 120A-N under binding capacity constraints during time periods 2 and 6. According to the complimentary slackness conditions 883C (as defined in Eqs. 70-73), one or more of the multipliers $\underline{\upsilon}(t)$ and $\overline{\upsilon}(t)$ are non-negative numbers for PGU 120A-N that are Capacity-constrained. The PGUs 120A-N of the power system 100 that are classified as being Capacity-constrained may be included in a time-varying set $K_t^c \equiv K^c(t)$.

As illustrated in FIG. 8, the valuation processor 862 may be configured to determine time-varying sets of PGU 120A-N 866, including sets $K^u(t)$, $K^r(t)$, and $K^c(t)$, each set specifying classifications for the PGUs 120A-N during the operating interval T (each PGU 120A-N being classified as either Unconstrained, Ramp-constrained, or Capacity-constrained). The classifications of the PGUs 120A-N may be based on the optimal generation trajectories G*(t), optimal ramping trajectories $\dot{G}$*(t), and projected net load D(t) of the valuation model 860 (and as determined by the optimal solution to the UC model 660). Based on the foregoing PGU classifications 862, the valuation processor 862 may be configured to derive the value of λ(t) (the marginal valuation metric 880) by use of Eq. 75, as set forth below. The classifications 866 may indicate the operating state of the PGUs 120A-N throughout the operating interval T Accordingly, in some embodiments, the classifications 866 may be referred to as "states" of the PGUs 120A-N, "operating states" of the PGUs 120A-N, and/or the like.

As disclosed above, an incremental load variation δD(t) at time t during the operating interval T may be satisfied by use of a) Unconstrained PGU 120A-N and/or b) Ramp-constrained PGU 120A-N available within the power system 100. PGUs 120A-N that are Ramp-constrained may be restricted to increasing generation at a limited, constant rate. PGUs 120A-N that are Capacity-constrained cannot compensate for the incremental load variation. As such, in Eq. 75, $$\frac{\partial G(t)}{\partial D(t)}$$

is zero for the Capacity-constrained PGU 120A-N (e.g., each PGU 120A-N in set $K^c(t)$ 866). Furthermore, the Lagrange multipliers $\underline{\upsilon}(t)$ and $\overline{\upsilon}(t)$ are zero for the Unconstrained and Ramp-constrained PGU 120A-N. Therefore, the term $$(\overline{\upsilon}(t) - \underline{\upsilon}(t))^T \frac{\partial G(t)}{\partial D(t)}$$

of Eq. 75 is uniformly zero over the operation period T. By similar reasoning, the term $$(\overline{\mu}(t) - \underline{\mu}(t))^T \frac{\partial \dot{G}(t)}{\partial D(t)}$$

in Eq. 75 would also be zero throughout this period. The power balance constraint of Eq. 60 requires that $$1^T \frac{\partial G(t)}{\partial D(t)}$$

be equal to 1 in Eq. 75. Applying these substitutions to Eq. 75 (and applying the limits as disclosed above in conjunction with Eq. 78), the resulting closed-form value of λ(t) is:

$$\lambda(t) = \left(\frac{\partial C(G(t), \dot{G}(t))}{\partial G(t)}\right)^T \frac{\partial D(t)}{\partial D(t)} + \left(\frac{\partial C(G(t), \dot{G}(t))}{\partial \dot{G}(t)}\right)^T \frac{\partial \dot{G}(t)}{\partial D(t)}. \quad \text{Eq. 79}$$

The quantity $IC_k^G(t)$ may be defined as the incremental generation cost rate of a particular PGU 120A-N ($G_k$), and the quantity $IC_k^{\dot{G}}(t)$ may be defined as the incremental generation cost rate of the PGU 120A-N ($G_k$), as follows:

$$IC_k^G(t) \triangleq \frac{\partial C_k(G_k(t), \dot{G}_k(t))}{\partial G_k(t)}, \quad \text{Eq. 80}$$

$$IC_k^{\dot{G}}(t) \triangleq \frac{\partial C_k(G_k(t), \dot{G}_k(t))}{\partial \dot{G}_k(t)}, \quad \text{Eq. 81}$$

Eq. 79 may be simplified to eliminate zero terms, and to arrange the remaining terms in summations as follows:

$$\lambda(t) = \sum_{k \in K_i^u \cup K_i^r} IC_k^G(t) \frac{\partial G_k(t)}{\partial D(t)} + \sum_{k \in K_i^u} IC_k^{\dot{G}}(t) \frac{\partial \dot{G}_k(t)}{\partial D(t)}, \; t \in \tau \quad \text{Eq. 82}$$

In Eq. 82, the terms $$\frac{\partial G_k(t)}{\partial D(t)} \text{ and } \frac{\partial \dot{G}_k(t)}{\partial D(t)}$$

are the generation and ramping variations of PGU 120A-N ($G_k$) contributing towards balancing the incremental load variation at time t.

The valuation processor 862 may be further configured to calculate incremental generation cost metrics 870A-N and incremental ramping cost metrics 872A-N for each PGU 120A-N in accordance with Eqs. 80 and 81. Similar to the conventional definitions for incremental generation cost rate, the incremental ramping cost metrics 872A-N may quantify a cost of an incremental change in ramping of a PGU 120A-N ($G_k$) at time t. The valuation processor may be further configured to calculate the marginal valuation metric 880 for power generated within the power system 100 in accordance with Eq. 82. The marginal valuation metric 880 may correspond to a weighted average of the incremental generation cost metrics 870A-N of the Unconstrained and Ramp-constrained PGU 120A-N of the power system 100 plus the weighted average of the incremental ramping cost rates of the unconstrained PGU 120A-N The valuation processor 862 may be further configured to calculate incremental generation cost metrics 870A-N and incremental ramping cost metrics 872A-N for each PGU 120A-N in accordance with Eq. 80 and 81. Similar to the conventional definitions for incremental generation cost rate, the incremental ramping cost metrics 872A-N may quantify a cost of an incremental change in ramping of a PGU 120A-N ($G_k$) at time t. The valuation processor may be further configured to calculate the marginal valuation metric 880 for power generated within the power system 100 in accordance with Eq. 82. The marginal valuation metric 880 may correspond to a weighted average of the incremental generation cost metrics 870A-N of the Unconstrained and Ramp-constrained PGU 120A-N of the power system 100 plus the weighted average of the incremental ramping cost metrics 872A-N of the unconstrained PGU 120A-N.

The control infrastructure may further include a coordination engine 890. The coordination engine 890 may be configured to act as an interface between a power system 100 and one or more PGUs 120A-N (and vice versa). The coordination engine 890 may provide the marginal valuation metric 880 to one or more power systems 100 and/or PGUs 120A-N. The coordination engine 890 may utilize the marginal valuation metric 880 to establish an economic price for power generated during a particular operating interval Tin accordance with a day-ahead operating profile, such as the power system configuration 160, disclosed above. Alternatively, or in addition, the coordination engine 890 may use to valuation metric 890 to establish an economic price for power provisioned during real-time operation of the power system 100 (e.g. power provisioned to respond to variations in the net load forecast 655). The coordination engine 890 may use the marginal valuation metric 880 as a basis for compensating PGU 120A-N for power generated thereby. The coordination engine 890 may determine an economic compensation 892A-N for each PGU 120A-N scheduled during the operating interval T The determined economic compensation 892A-N for each PGU 120A-N may correspond to the utilization of the PGU 120A-N during the operating interval T (based on the generation trajectory $G^*_k(t)$, ramping trajectory $\dot{G}^*_k(t)$ and/or binary commitment value $I^*_k(t)$ of the 120A-N ($G_k$) during the operating interval T). The determined economic compensation 892A-N for a PGU 120A-N may, in one embodiment, comprise integrating the determined marginal valuation metric 880 for power provisioned during the operating interval T as scaled by the utilization of the PGU 120A-N. The marginal valuation metric 880 may provide a continuous-time valuation for power as a function of time t, as such, the determined economic compensation 892A-N may be dependent on the particular times t the particular PGU 120A-N is utilized during the operating interval T.

The marginal valuation metric 880 disclosed herein may enable PGUs 120A-N to be appropriately compensated for ramping costs, and may quantify a value to the ramping capacity provided by the PGUs 120A-N. The contribution of ramping costs and/or ramping capacity in the marginal valuation metric 880 may be established in a transparent and mathematically provable manner, which may enable the PGUs 120A-N to rely on the marginal valuation metric 880 as valuation of ramping costs and/or capacity. As disclosed above, the cost function Ck upon which the marginal valuation metric 880 is based explicitly quantifies costs incurred by respective PGUs 120A-N due to ramping trajectory $\dot{G}$ (as opposed to only generation trajectory G as in conventional systems). As disclosed above, the marginal valuation metric 880 is predicated on PGU cost functions that are defined in terms of both generation trajectory (and cost) and ramping trajectory (and cost) (e.g., cost function $C_k(G_k, \dot{G}_k)$, which, as disclosed above, may enable each PGU 120A-N ($G_k$) to specify incremental costs incurred due to ramping, and which may be particular to the PGU 120A-N, and differ from ramping costs of other PGU 120A-N). In addition, the marginal valuation metric 880 provides an explicit valuation to PGUs 120A-N having available ramping capacity during the operating period T By way of non-limiting example, the valuation processor 862 is configured categorize the PGUs 120A-N as Unconstrained, Ramp-constrained, or Capacity-constrained during the operating period T and to use the categorizations (866) to develop the marginal valuation metric 880. Based on the foregoing, it can be shown that the Lagrange multiplier trajectory $\lambda(t)$ from which the marginal valuation metric 880 is derived explicitly embeds the impact of ramping costs (and quantifies the value of ramping capacity) in the resulting marginal valuation metric 880. The marginal valuation metric 880 may, therefore, comprise a mathematically proven approach quantifying a valuation for ramping costs and/or capacity of the PGUs 120A-N. Therefore, the marginal valuation metric 880 may provide an incentive for PGUs 120A-N to develop ramping capability (since the PGUs 120A-N will be provisioned a valuation for such ramping capacity, as opposed to ad-hoc valuations that involve uplift compensation, which may not be equitably provisioned to the PGUs 120A-N).

The additional ramping capacity incentivized by quantifying the valuation of ramping cost and/or capacity in a provable, transparent manner may enable the power system 100 to be better equipped to respond to net load variations and avoid scarcity events (e.g., ramping scarcity events). Providing an explicit valuation of ramping costs (as opposed to relying on ad-hock uplift) may provide an incentive for PGUs 120A-N to develop ramping capacity, based on the assurance that the ramping capacity provided thereby will be valued accordingly (as opposed to being ignored as in conventional approaches to power valuation). As disclosed above, the contribution of ramping costs in the marginal valuation metric 880 may be demonstrated mathematically. Incorporating an explicit valuation for ramping costs and/or capacity may enable PGUs 120A-N to be compensated in accordance with the ramping capacity provided thereby, and may avoid the need for ad-hoc uplift corrections. Moreover, providing an explicit and provable valuation for ramping capacity may enable PGUs 120A-N to develop additional ramping capacity. More specifically, generating the marginal valuation metric 880 that explicitly merits PGUs 120A-N based on ramping trajectory in a transparent, provable manner may provide an basis for the development of additional ramping capacity (based on the assurance that the cost and value of such ramping capacity will be appropriately valued). As disclosed herein, the marginal valuation metric 880 may be used to provision resources to the PGUs 120A-N in exchange for the power generated thereby. Provisioning resources to the PGUs 120A-N may comprise providing economic compensation to the PGUs 120A-N (e.g., 892A-N). The marginal valuation metric 880 may, in some embodiments, comprise a marginal electricity price. By way of non-limiting example, the cost functions Ck for the PGUs 120A-N may quantify the economic costs for power generation and/or ramping, and the resulting marginal valuation metric 880 may comprise the marginal electricity price for the power system 100 (e.g., in terms of dollar per MW in unit of time). The coordination engine 890 may use the marginal valuation metric 880 to determine an economic compensation for the PGUs 120A-N as disclosed herein. Using the marginal valuation metric 880 as a basis for provisioning resources to the PGUs 120A-N may shift resources to PGUs 120A-N on the basis of ramping capacity. Provisioning resources to PGUs 120A-N on the basis of ramping capacity may provide an incentive (and explicit economic basis) that may enable the PGUs 120A-N to develop additional ramping capacity. The power system 110 may leverage the additional ramping capacity provided by the PGUs 120-A-N (as incentivized by the marginal valuation metric 880) to respond to net load variations. Accordingly, the marginal valuation metric 880 disclosed herein may improve the operation of the power system 100 by: a) providing an explicit basis for the development of ramping capacity by the PGUs 120A-N of the power system 100, wherein b) the increased ramping capacity enables the power system 100 to be better equipped to handle real-time net load variations, while avoiding scarcity conditions.

In some embodiments, the valuation engine 862 890 may be further configured to generate a marginal ramping valuation metric 881. The marginal ramping valuation metric 881 may identify and/or extract the portion of the marginal valuation metric 880 that corresponds to ramping capacity (and/or ramping costs) of the PGUs 120A-N. The marginal ramping valuation metric 881 may provide an explicit indication of the valuation of ramping costs and/or ramping capacity over the operating period T (and/or during real-time operation). The marginal ramping valuation 881 may comprise a component of the continuous-time marginal valuation metric 880 and, as such, may be expressed and/or represented as a continuous-time quantity separate from (and/or in conjunction with) the marginal valuation metric 880. In some embodiments, the marginal ramping valuation metric 881 may comprise a marginal ramping price (e.g., price for PGU ramping in units of time). The marginal ramping valuation metric 881 may be derived from the determined incremental ramping costs 872A-N for the PGUs 120A-N as disclosed above. In some embodiments, the coordination module may be further configured to determine a ramping economic compensation 893A-N for the PGUs 120A-N. The ramping economic compensation 893A-N may indicate an amount of economic compensation provisioned to each PGU 120A-N due to the ramping costs and/or capacity provided thereby. The economic ramping compensation 893A-N may comprise a component and/or portion of the economic compensation 892A-N determined for a particular PGU 120A-N.

The coordination engine 890 may be configured to transmit one or more of the marginal valuation metric 880, marginal ramping valuation metric 881, economic compensation 892A-N, and/or ramping economic compensation 893A-N to PGUs 120A-N by use of, inter alia, the controller 148 and/or communication resources 605. The these quantities may provide explicit, transparent, provable basis for development of additional ramping capacity by the PGUs 120A-N. A PGU 120A-N may use the marginal ramping valuation metric 881 to determine whether to develop additional ramping capacity for the power system 100 (based on the price established for such ramping capacity). A PGU 120A-N may use the ramping economic compensation 893A-N to determine whether the cost function Ck thereof adequately reflects the ramping costs incurred by the PGU 120A-N, which may also be used as a basis for determining whether to develop additional ramping capacity at the PGU 120A-N. As disclosed above, development of additional ramping capacity by the PGUS 120A-N may enable the power system 100 to respond to net load variations while avoiding scarcity conditions.

The coordination engine 890 may be communicatively coupled to the monitor 142. The monitor 142 may detect variations in the net load on the power system 100. In response, the coordination engine 890 may be configured to select one or more PGUs 120A-N to compensate in order to, inter alia, avoid scarcity conditions. The coordination engine 890 may evaluate PGU classifications 862, incremental generation cost metrics 870A-N and/or incremental ramping cost metrics 872A-N of the PGUs 120A-N to select an optimal set of PGUs 120A-n to respond to the net load variation. The PGU classifications 865A-D may identify PGUs 120A-N that are available to provide additional capacity (and distinguish PGUs 120A-N that are unconstrained from PGUs 120A-N that are Ramp-constrained). The coordination engine 890 may evaluate the incremental generation cost metrics 870A-N of the PGUs 120A-N to identify PGUs 120A-N available to satisfy the net load variation at the lowest cost. The coordination engine 890 may be further configured to evaluate the incremental ramping cost metrics 870A-N to distinguish between PGUs 120A-N with similar cost characteristics. In some embodiments, the coordination engine 890 may select a PGU 120A-N with lower ramping costs to satisfy a short-term variation even though the PGU 120A-N may have higher generation costs than other available PGUs 120A-N. The coordination engine 890 may select the PGU 120A-N with the lower ramping costs over a PGU with more favorable generation costs since, in some instances, the ramping costs incurred to ramp up, and back down, for a short term load variation may outweigh the generation costs. The coordination engine 890 may be configured to issue configuration commands 166 and/or 168 to engage the selected PGU 120A-N, and may disengage the PGU 120A-N in response to determining that the net load variation has subsided.

As disclosed above, incorporation of explicit ramping costs into the marginal valuation metric 880 may define a new criterion for the marginal generating unit in power system operation, where PGU 120A-N merit the others and become marginal not only for their less incremental ramping cost metric 870A-N, but also for their less incremental ramping cost metric 872A-N. By way of non-limiting example, the power system 100 may include PGU 120A and PGU 120B that have the same incremental generation cost metric 870A and 870B. The power system manager 646 and/or coordination engine 890 may be required to select either PGU 120A or PGU 120B to provide generate additional power for the power system (e.g., due to a load variation). The selection may be based on the lower overall cost, which may be determined by the incremental ramping cost metrics 872A and 872B of the PGUs 120A-B (the PGU 120A-B would be the marginal and set a lower cost for power generation, as established by Eq. 82). By contrast, a conventional approach to power system scheduling that does not consider ramping costs would not distinguish between PGUs 120A and 120B (due to inadequate modeling of the ramping costs of the respective PGUs 120A-B).

As disclosed above, the Lagrange multiplier λ(t) of Eq. 60 (of the valuation model 860) may be used to generate the marginal valuation metric 880, which may define an optimal valuation for power generated for the power system 100 in continuous-time and during a particular operating interval T Other Lagrange multipliers of the valuation model 860 (of Eq. 59-63) may be leveraged to model other aspects and/or characteristics of the power system 100.

In one embodiment, the valuation processor 862 is configured to determine Lagrange multipliers corresponding to capacity constraints of the power system. By way of example, at time t a particular PGU 120K may reach one of its capacity limits. The corresponding non-negative Lagrange multipliers $\underline{\upsilon}_k$(t) and $\overline{\upsilon}_k$(t) of the binding capacity constraints may be calculated using the Euler-Lagrange Eq. 67, as follows:

$$\underline{\upsilon}_k(t) = IC_k^G(t) - \frac{d}{dt}\left(IC_k^{\dot{G}}(t)\right) - \lambda(t), \quad \text{Eq. 83}$$

$$\overline{\upsilon}_k(t) = \lambda(t) - IC_k^G(t) + \frac{d}{dt}\left(IC_k^{\dot{G}}(t)\right), \quad \text{Eq. 84}$$

In Eqs. 83 and 84, λ(t) may be calculated in accordance with Eq. 82. The multipliers $\underline{\upsilon}_k$(t) and $\overline{\upsilon}_k$(t) may quantify the sensitivity of the optimal cost functional J* to the incremental changes in the value of minimum and maximum capacities of PGU 120K at time t. In Eq. 83, the positivity of $\underline{\upsilon}_k$(t) indicates that, when the PGU 120K is scheduled at minimum capacity at time t, the incremental generation cost metric 870K minus the time derivative of the incremental ramping cost 872K is more than the marginal price at that time (t). In addition, positivity of $\overline{\upsilon}_k$(t) in Eq. 84 indicates that the incremental generation metric 870K generating at maximum capacity minus the time derivative to the incremental ramping metric 872K is less than the marginal price at that time (t). In some embodiments, the valuation processor 862 is configured to calculate the quantities of Eq. 83 and 84 875A-N for one or more of the PGU 120A-N, as disclosed herein.

By way of further example, at time tr the power system 100 may require additional power generation resources at a particular generation capacity at a required ramp rate. A PGU 120K may reach one of its down or up ramping limits at time tr. However, at time tr, the PGU 120K may not have reached any of its capacity constraints. Another, lower cost, PGU 120C may be capable of providing the required generation capacity, but may not be able to satisfy the required ramp rate. In this case, the higher-cost PGU 120K may be selected to provide the additional power generation resources, due to being capable of meeting the required ramp rate. From the perspective of the PGU 120A-N, the selection mechanisms dictated by the ramping constraints of the PGU 120A-N provides an incentive to develop ramping capacity. Having lower cost generation resources does not ensure competitiveness if the lower-cost resources may cannot satisfy the ramping capacity requirements of the power system 100. Selection and/or scheduling of PGU 120A-N on the basis of ramping capacity rather than generation cost alone provides a natural competency to PGU 120A-N with higher ramping constraints.

In some embodiments, the valuation processor 862 is configured to calculate quantities 876A-N configured to quantify the sensitive of the optimal cost function J* to incremental changes in the value of the down/up ramping limits of particular PGU 120A-N ($G_k$), which may quantify the relative importance of ramping capacity with respect to PGU scheduling. The quantities 876A-N may correspond to non-negative Lagrange multipliers $\underline{\mu}_k(t)$ and $\overline{\mu}_k(t)$ per Eqs. 85 and 86 below.

$$\underline{\mu}_k(t) = -IC_k^{\dot{G}}(t) - \int_{t_r}^{t}(IC_k^{G}(t) - \lambda(t))dt, \quad \text{Eq. 85.}$$

$$\overline{\mu}_k = \int_{t_r}^{t}(IC_k^{G}(t) - \lambda(t))dt - IC_k^{\dot{G}}(t), \quad \text{Eq. 86.}$$

In Eqs. 85 and 86, $\lambda(t)$ may be calculated in accordance with Eq. 82. As disclosed above, the multipliers $\underline{\mu}_k(t)$ and $\overline{\mu}_k(t)$ may indicate the sensitivity of the optimal cost functional J* to incremental changes in the value of the down/up ramping limits of particular PGU 120A-N ($G_k$).

Figure 10:
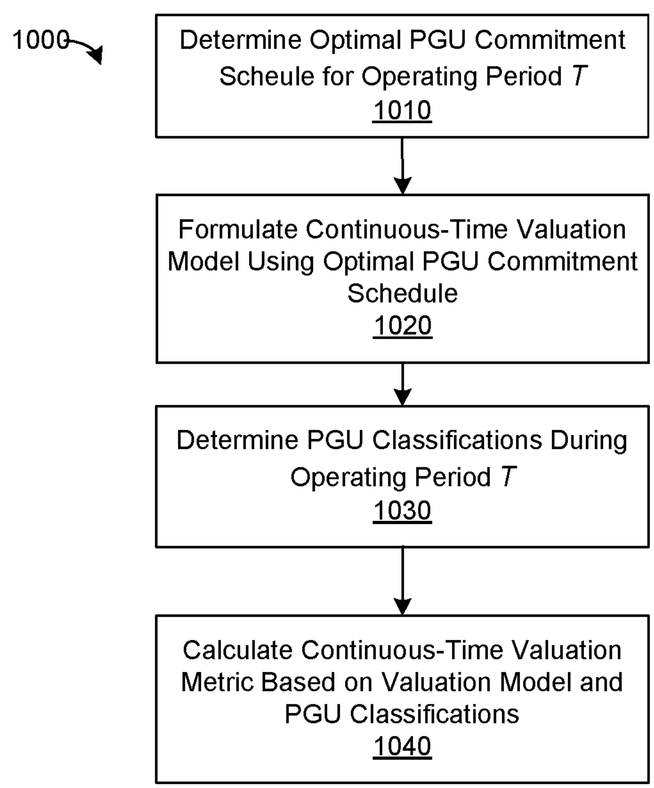
FIG. 10 is a flow diagram of one embodiment of a method for managing power generating units.

FIG. 10 is a flow diagram of one embodiment of a method 1000 for managing a PGU. One or more of the steps of the method 1000 (and/or the other methods disclosed herein) may be embodied as instructions stored on a non-transitory computer-readable storage medium. The instructions may be configured to cause a computing device to perform the disclosed method steps. Alternatively, or in addition, one or more of the steps of the method 1000 (and/or the other methods disclosed herein) may be embodied and/or implemented by hardware components, such as a circuit, monitoring device, control device, communication device, and/or the like.

Step 1010 may comprise determining an optimal PGU commitment schedule for an operating period T The commitment schedule may be configured to satisfy a net load on the power system 100 during the operating period T Step 1010 may comprise formulating a continuous-time UC model 660 for the power system 100 by, inter alia: determining a continuous-time net load forecast for the power system 100, determining continuous-time generation and/or ramping constraints of the PGUs 120A-N of the power system, and so on. Step 1010 may further comprise determining an optimal solution for the optimization problem formulated by the UC model 660 by: recasting the UC model 660 as an MILP problem with a finite-dimensional decision space (e.g., utilizing Bernstein polynomials to model the continuous-time generation and/or ramping trajectories of the PGU 120A-N), and determining an optimal solution to the resulting MILP problem, as disclosed herein. The optimal PGU commitment schedule may comprise optimal generation, ramping, and commitment trajectories for each PGU 120A-N of the power system 100 (e.g., $G^*(t)$, $\dot{G}^*(t)$, and $I^*(t)$).

Step 1020 may comprise formulating a continuous-time valuation model using the optimal PGU commitment schedule of step 1000. Step 1020 may comprise deriving a valuation model 860, as disclosed herein, which may comprise, inter alia, fixing the commitment variables to their optimal values in accordance with the continuous time UC model 660, and deriving a corresponding valuation model 860 in accordance with Eq. 59-63 above. Step 1020 may further comprise establishing optimality conditions 865A-D for the valuation model 860, as disclosed herein. The optimality conditions 865A-N may include, but are not limited to: an Euler-Lagrange optimality condition 865A, a transversality condition 865B, a complimentary slackness condition 865C, and an original problem constraint 865D.

Step 1030 may comprise assigning classifications to the PGUs 120A-N during particular time periods of the operating interval T (e.g. PGU classifications 866). PGUs 120A-N may be classified as one of: Unconstrained, Ramp-constrained, and Capacity-constrained, as disclosed herein. A PGU 120A-N ($G_k$) may be assigned a particular classification at time $\tau$ based, inter alia: $G_k(\tau)$, $\dot{G}_k(\tau)$, generation constraints of the PGU 120A-N, and ramping constraints of the PGU 120A-N. Step 1030 may comprise assigning the Unconstrained classification to the PGU 120A-N ($G_k$) at time $\tau$ in response to determining that the PGU 120A-N ($G_k$) is capable of flexibly changing its generation and ramping trajectory at time $\tau$ (e.g., determining that $G_k(\tau)$ can be flexibly modified within the generation constraints, and $\dot{G}_k(\tau)$ can be flexibly modified within the ramping constraints). Step 1030 may comprise assigning the Ramp-constrained classification in response to determining that the PGU 120A-N ($G_k$) is capable of flexibly changing $G_k(\tau)$ but that $\dot{G}_k(\tau)$ is constrained.

Step 1040 may comprise calculating a continuous-time valuation metric 880 for the power system 100 based on the valuation model 860 and the PGU classifications 866.

Step 1040 may comprise calculating incremental generation metrics 870A-N and incremental ramping cost metrics 872A-N for the PGUs 120A-N in accordance with Eq. 80 and 81 (and the PGU classifications 866), as disclosed above. Step 1040 may further calculating the continuous-time valuation metric 880 as a weighted average of the incremental generation cost metrics 870A-N of: a) the Unconstrained PGUs 120A-N and the Ramp-constrained PGUs 120A-N (per the PGU classifications 866), and b) a weighted average of the incremental ramping cost metrics 872A-N of the Unconstrained PGUs 120A-N during the operating period T (e.g., at each time $\tau$ within T). The marginal valuation metric 880 may be calculated in accordance with Eq. 82, as disclosed herein.

Step 1040 may further comprise communicating the marginal valuation metric 880 within the power system 100 (e.g., to PGUs 120A-N, the power system manager 646, the scheduler 846, and so on). The marginal valuation metric 880 may quantify a value of ramping costs and/or capacity provided by the PGUs 120A-N rather than generation alone. Accordingly, the marginal valuation metric 880 of step 1040 may comprise a transparent, provable, and explicit valuation for ramping costs and/or capacity of the PGUs 120A-N, which may provide the basis for development of additional ramping capacity within the power system 100. Step 1040 may further include determining a marginal ramping valuation metric 881 to explicitly identify a valuation corresponding to ramping capacity.

Step 1040 may comprise using the marginal valuation metric 880 to establish a continuous-time economic pricing model for power generated within the power system during the operating interval T The continuous-time economic pricing model may the economic value for ramping capacity provided by the PGU 120A-N (in accordance with the ramping trajectories and/or PGU classifications during the operating interval T).

In some embodiments, step 1040 further includes provisioning resources to the PGU 120A-N in accordance with the marginal valuation metric 880. Provisioning resources to the PGUs 120A-N may comprise compensating the PGU 120 in accordance with the marginal valuation metric 880 by, inter alia, determining an economic compensation 892A-N for each PGU 120A-N scheduled during the operating interval T Step 1040 may further comprise determining an economic ramping compensation 893A-N for each PGU 120A-N to explicity identify an economic compensation corresponding to the ramping capacity provided by the PGUs 120A-N.

Figure 11:
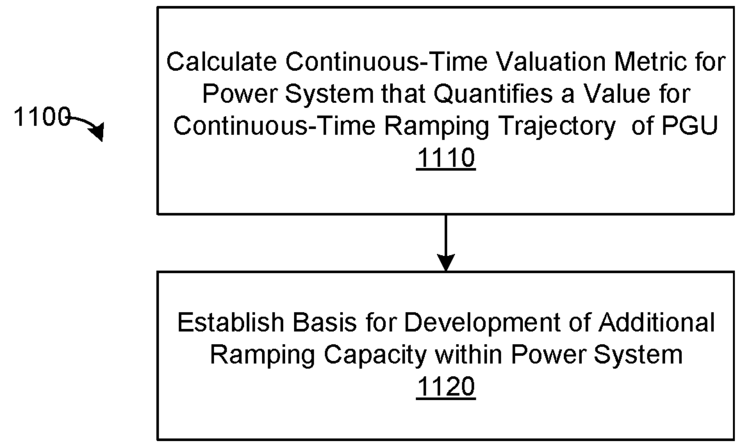
FIG. 11 is a flow diagram of one embodiment of a method for development ramping capacity for a power system.

FIG. 11 is a flow diagram of another embodiment of a method 1100 for managing power generating units of a power system. Step 1100 may comprise determining a continuous time valuation metric for the power system 100 that quantifies a value for continuous-time ramping trajectory of the PGUs 120A-N of the power system 100. Step 1100 may comprise calculating the marginal valuation metric 880 for the power system 100 over a particular operating interval T, as disclosed herein. The marginal valuation metric 880 may quantify a continuous-time cost and/or value associating with the ramping trajectories $\dot{G}_k$ of each PGU 120A-N as opposed to being based exclusively on power generated by the PGUs 120A-N.

Step 1120 may comprise establishing a basis for development of additional ramping capacity within the power system 100. Step 1120 may comprise using the marginal valuation metric 880 of step 1100 as a transparent, provable, and quantifiable basis for establishing a valuation of ramping capacity provided by the PGUs 120A-N. Step 1120 may comprise one or more of a) providing the marginal valuation metric 880 to the PGUs 120A-N, b) using the marginal valuation metric 880 to provision resources to the PGUs 120A-N, c) using the marginal valuation metric 880 to establish economic pricing for power generated for the power system 100 during the operating interval T, d) using the marginal valuation metric 880 to determining economic compensation 892A-N for the PGU 120A-N, and so on. Step 1120 may further comprise determining a marginal ramping valuation metric 881 to explicitly identify a valuation of ramping capacity separate from the overall marginal valuation metric 880 Step 1120 may comprise calculating quantities 875A-N and/or 876A-N, which may quantify the degree to which the optimal cost functional J* depends on minimum and maximum generation and/or ramping capacity of the PGUs 120A-N, as disclosed above. Step 1120 may also include determining ramping economic compensation 893A-N for the PGUs 120A-N, the ramping economic compensation 893A-N indicating an economic compensation corresponding to the ramping trajectory of the PGU 120A-N. The quantities of step 1120 may comprise explicit, transparent, and provable indications of a valuation for ramping capacity in the marginal valuation metric 880. Accordingly, the marginal valuation metric 880 (and the other quantifies disclosed in conjunction with step 1120) may comprise an incentive for development of additional ramping capacity within the power system 100. A PGU 120A-N may use the marginal valuation metric 880 to establish an economic benefit corresponding to resources used to maintain and/or develop additional ramping capacity for the power system 100.

Figure 12:
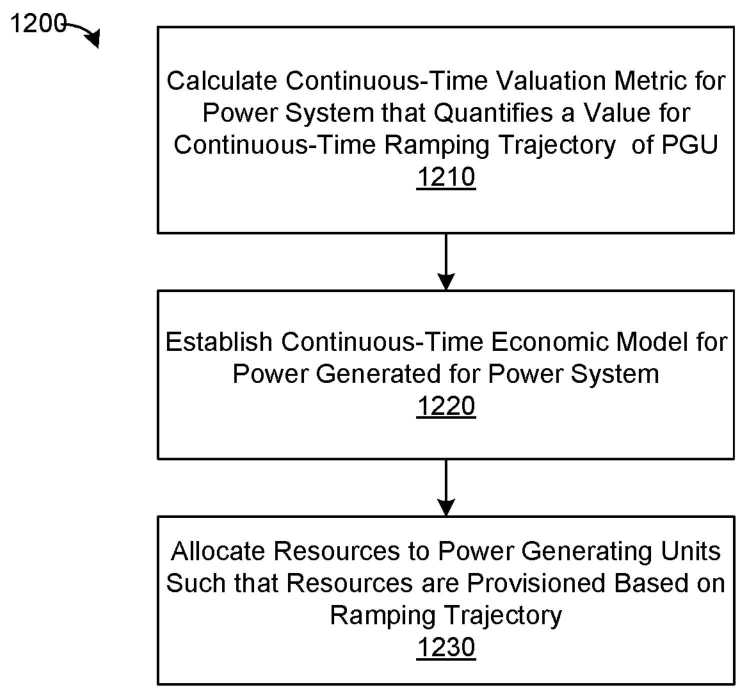
FIG. 12 is a flow diagram of one embodiment of a method for provisioning resources to power generating units of a power system.

FIG. 12 is a flow diagram of another embodiment of a method 1200 for managing power generating units of a power system 100. Step 1210 may comprise calculating the marginal valuation metric 880 for the power system as disclosed herein.

Step 1220 may comprise establishing a continuous-time economic model for power generated for the power system during the operating interval T. Step 1220 may comprise deriving the continuous-time economic model from the marginal valuation metric 880 (and/or using the marginal valuation metric 880 as the continuous-time economic model). Step 1220 may further comprise establishing that the continuous-time economic model is based on ramping trajectories of the PGUs 120A-N (ramping cost and/or capacity) as opposed to generation alone, as disclosed herein.

Step 1230 may comprise allocating resources to the PGU 120A-N such that resources are allocated to the PGUs 120A-N I based on the ramping trajectories of the PGUs 120A-N (e.g., based on ramping costs incurred by the PGUs 120A-N). Step 1230 may comprise allocating resources to the PGU 120A-N in accordance with the continuous-time economic model of Step 1220 (to compensate the PGUs 120A-N for power generated during the operating interval T). Step 1230 may comprise determining an economic compensation 892A-N for each PGU 120A-N, which may compensate the PGUs 120A-N in accordance with its continuous-time ramping trajectory thereof (ramping costs and/or capacity) as opposed to power generation alone. Step 1230 may comprise determining economic payments to each PGU 120A-N. The economic payments may compensate the PGUs 120A-N in accordance with the ramping capacity provide by the PGUs 120A-N and/or the ramping costs incurred by the PGUs 120A-N. Allocating resources to the PGUs 120 in accordance with continuous-time ramping trajectories may ensure that the PGUs 120A-N are adequately compensated for the costs associated with ramping. Therefore, allocating resources in accordance with step 1230 (based on the marginal valuation metric 880 disclosed herein) may obviate the need for inefficient, ad-hoc uplift payments to the PGUs 120A-N.

Figure 13:
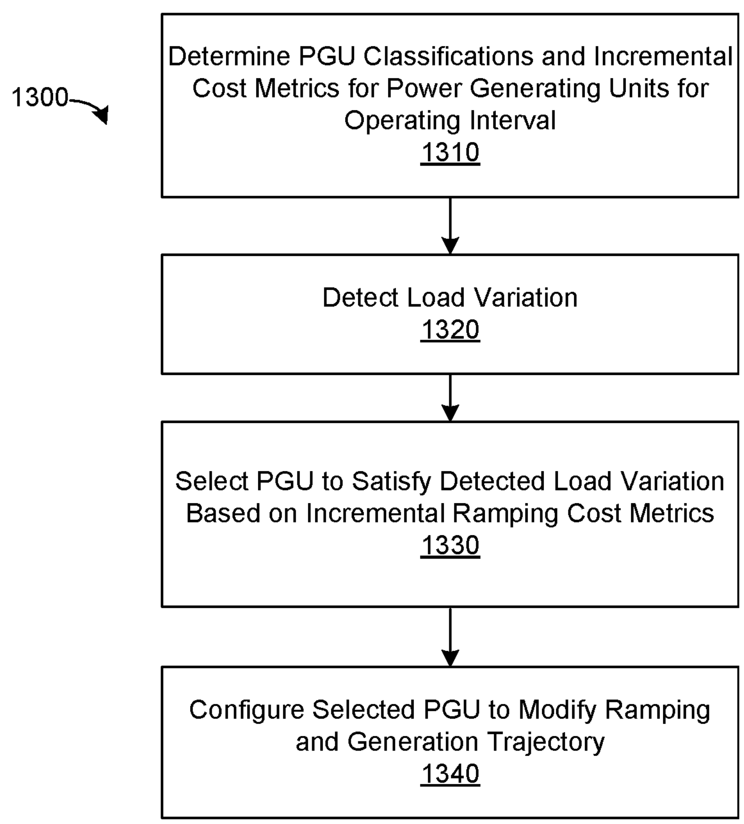
FIG. 13 is a flow diagram of one embodiment of a method for satisfying variations from a load forecast for a power system.

FIG. 13 is a flow diagram of another embodiment of a method 1300 for managing a power system 100. Step 1310 may comprise determining PGU classifications for the PGUs 120A-N of the power system during a particular operating period T Step 1310 may further comprise determining incremental cost metrics for the PGUs 120A-N (e.g., incremental generation cost metrics 870A-N and/or incremental ramping cost metrics 872A-N) during the operating period T. The PGU classifications and/or incremental cost metrics 870A-N and/or 872A-N may be calculated as disclosed herein, which may comprise, inter alia: calculating an optimal PGU commitment schedule for the PGUs 120A-N based on a continuous-time UC model 660 of the power system 100 (G*(t), Ġ*(t), and I*(t)); formulating a continuous-time valuation model 860 using the optimal PGU commitment schedule; establishing optimality conditions 865A-D for the valuation model 860; assigning classifications to the PGUs 120A-N during particular time periods of the operating interval T; and calculating the incremental generation metrics 870A-N and incremental ramping cost metrics 872A-N for the PGUs 120A-N in accordance with Eq. 80 and 81 (and the PGU classifications 866). Step 1320 may further comprise configuring the power system 100 to operate in accordance with the optimal PGU commitment schedule during the operating period T, as disclosed herein.

Step 1320 may comprise detecting a variation in the load on the power system 100 at a particular time τ within the operating period T (e.g., during real-time operation). Step 1320 may comprise detecting the load variation in response to monitoring the power system 100 (by use of the monitor 142 and/or in response to monitoring data 152 acquired thereby).

Step 1330 may comprise selecting a PGU 120A-N to satisfy the detected load variation. The PGU 120A-N may be selected to provide additional power generation resources in order to, inter alia, prevent a scarcity condition within the power system 100. Step 1330 may comprise selecting the PGU 120A-N based on one or more of the classifications assigned to the PGUs 120A-N at time τ (PGU classifications 866) and the incremental cost metrics 870A-N and/or 872A-N. The classifications assigned to the PGUs 120A-N at time τ may identify a set of PGUs 120A-N that are available to satisfy the load variation. In particular, the PGUs 120A-N that are classified as either Unconstrained or Ramp-constrained may be included in the first set (deemed available to satisfy the load variation), and the PGUs 120A-N that are classified as Capacity-constrained at time τ may not be included in the first set. Step 1330 may comprise selecting the PGU 120A-N to satisfy the load variation from the identified set. The PGU 120A-N may be selected in accordance with the incremental cost metrics 870A-N and/or 872A-N of the PGUs 120A-N. For example, the PGU 120A-N could be selected based on lowest generation cost (based on the incremental generation cost metrics 870A-N).

In the FIG. 13 embodiment, step 1330 comprises selecting the PGU 120A-N to satisfy the load variation based on the incremental ramping cost metrics 872A-N. Selecting the PGU 120A-N based on lowest incremental ramping cost metric 872A may minimize the costs associated changes in ramping trajectory. Since the load variation is transient, the ramping costs incurred by the PGU 120A-N selected to satisfy the variation may outweigh its generation costs (the selected PGU 120A-N may only be required to generate additional power for a short time).

The overall cost associated with satisfying the variation may be a combination of generation and ramping (e.g., as defined by incremental generation cost metric 870A-N and the incremental ramping cost metric 872A-N for the PGU 120A-N). The overall generation cost, however, may depend on the duration of the load variation. In some embodiments, step 1330 may comprise estimating a duration for the load variation and, based on the estimated duration, selecting the PGU 120A-N to satisfy the load variation that would result in the lowest overall cost as determined by a) the incremental generation cost metric 870A-N and estimated duration, and b) the incremental ramping cost metric 872A-N.

Step 1340 may comprise configuring the selected PGU 120A-N to satisfy the detected load variation, which may comprise modifying the generation trajectory and/or ramping trajectory of the PGU 120A-N, as disclosed herein.

Referring to FIGS. 1, 6, and 8, portions of the power system infrastructure 110, such as the power system communication infrastructure 118, control infrastructure 140, monitor 142, load profiler 144, manager 146, manager 646, controller 148, and/or the like, may be embodied as instructions stored on a non-transitory, computer-readable storage medium (e.g., instructions stored on non-transitory storage resources of an MCCD). The instructions may be configured to cause a hardware computing device, such as an MCCD, to perform operations for managing the power system 100, as disclosed herein. In some embodiments, the instructions may be configured for execution by a processor. Execution of the instructions by the processor may be configured to cause the hardware device to perform certain operations and/or processing steps for managing the power system 100. Alternatively, or in addition, the instructions may be configured for execution within a particular execution environment, such as a virtual machine, a Java virtual machine, a scripting environment, and/or the like. In some embodiments, one or more of the instructions may comprise configuration data of a hardware device, such as FPGA configuration data, device firmware, device settings, and/or the like, which may be configured to cause the hardware device to perform certain operations and/or processing steps for managing the power system 100, as disclosed herein.

Portions of the control infrastructure 140, such as the monitor 142, monitoring devices 111A-N, 121A-N, 131A-N, controller 140 (and corresponding elements 142, 144, 146, and so on), may comprise hardware components, which may include, but are not limited to: circuits, programmable logic devices (e.g., field-programmable gate array devices), application-specific integrated circuits, special-purpose hardware devices, monitoring devices, control devices, communication devices, MCCDs, and/or the like.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of this disclosure.

What is claimed is:

1. A non-transitory, computer-readable storage medium comprising instructions configured to cause a computing device to perform operations for power system management, the operations comprising:

determining a generation trajectory for a plurality of power generating units to satisfy a net load forecast during an operating interval of the power system, the generation trajectory corresponding to a ramping trajectory for the power generating units;

determining an incremental ramping cost metric for a first one of the power generating units, the incremental ramping cost metric quantifying a cost incurred to ramp the first power generating unit at a designated time during the operating interval;

assigning respective classifications to the power generating units, each classification corresponding to a respective time during the operating interval, wherein the classifications are assigned based on one or more of generation limits and ramping limits of the power generating units; and configuring the first power generating unit to compensate for a variation in load on the power system based on the determined incremental ramping cost metric for the first power generating unit.

2. The non-transitory computer-readable storage medium of claim 1, the operations further comprising:

determining an incremental ramping cost metric for a second one of the power generating units, the second power generating unit having an incremental generation cost metric that is substantially equivalent to an incremental ramping cost metric of the first power generating unit; and selecting the first power generating unit to compensate for the variation in the load in response to comparing the incremental ramping cost metrics of the first and second power generating units.

3. The non-transitory computer-readable storage medium of claim 1, wherein the operations further comprise:

determining a valuation metric for power generated by the power generating units during the operating interval, the valuation metric incorporating a ramping cost of one or more of the power generating units.

4. The non-transitory computer-readable storage medium of claim 3, wherein determining an economic value of the power generated by the power generating units is based on the determined valuation metric.

5. The non-transitory computer-readable storage medium of claim 1, wherein determining classification assignments corresponding to the respective time during the operating interval is performed by:

assigning a capacity-constrained classification to power generation units determined to be operating at a generation limit at the respective time;

assigning a ramp-constrained classification to power generation units determined to be operating at a ramping limit at the respective time; and assigning an unconstrained classification to power generating units not assigned any of the capacity-constrained classification and the ramp-constrained classification.

6. The non-transitory computer-storage medium of claim 5, wherein the variation in load is detected at the respective time, and wherein the operations further comprise:

selecting the first power generating unit in response to determining that the first power generating unit is assigned one of the unconstrained classification or the ramp-constrained classification at the respective time.

7. A system, comprising:

a computing device communicatively coupled to a plurality of generating units, the computing device comprising:

a scheduler configured to assign generating units to generate power during an operating period of a power system, each generating unit having a respective generation trajectory over the operating period, wherein:

a power system manager is configured to determine a ramping cost metric to quantify costs incurred by the generating units due to variations to the generation trajectories within the operating period, and respective classifications are assigned to the power generating units, each classification corresponding to a respective time during the operating period, the classifications being assigned based on one or more of generation limits and ramping limits of the power generating units; and a valuation processor configured to determine the classifications of the generating units during the respective time of the operating period, wherein determining a corresponding classification of a generating unit at the respective time comprises:

determining whether the generating unit is constrained by one or more of the generating unit's generating limit and the generating unit's ramping limit at the respective time; and formulating a continuous-time valuation metric for power generated for the power system during the operating period based on (1) the generation trajectories of the generating units, (2) the classifications of the generating units during the operating period, and (3) the ramping cost metric.

8. The system of claim 7, further comprising a coordination engine configured to provision resources to the generating units based on the continuous-time valuation metric.

9. The system of claim 7, further comprising a coordination engine configured to determine a time-variant price for power generated during the operating period based on the continuous-time valuation metric.

10. The system of claim 7, wherein the valuation processor is configured to determine respective continuous-time incremental cost metrics for a first generating unit and a second generating unit, the incremental cost metrics based on respective generation and ramping cost functions of the first and second generating units.

11. The system of claim 10, wherein the scheduler is configured to select one of the first generating unit and the second generating unit to satisfy a variation in a load on the power system at a particular time during the operating period based on the incremental cost metrics for the generating units at the particular time.

12. The system of claim 10, wherein the incremental cost metrics comprise incremental generation cost metrics configured to quantify an incremental cost for modifying an amount of power being generated by the generating units at the particular time.

13. The system of claim 10, wherein the incremental cost metrics comprise incremental ramping cost metrics configured to quantify an incremental cost for modifying a power generation rate of the generating units.

14. A method, comprising:

scheduling generating units to produce power for a power system during an operating window, wherein scheduling the generating units comprises determining an optimal solution to a cost function for each of the generating units, each cost function quantifying a cost incurred by a generating unit during the operating window, including a generation cost for generating power during the operating window and a ramping cost for changes in power generation during the operating window;

formulating a continuous-time valuation metric for power produced during the operating window by;

determining classifications for the generating units throughout the operating window, wherein a corresponding classification of a generating unit at a time within the operating window is determined by comparing a ramp rate of the generation unit at the time to ramping limits of the generating unit and comparing an amount of power produced by the generating unit at the time to one or more generation limits, whereby the classifications are assigned to the power generating units in a manner such that each of the classifications corresponds to the time the operating window and such that the classifications are assigned based on one or more of the generation limits or the ramping limits of the power generating units, calculating incremental valuation metrics for generating units throughout the operating window based on the determined classifications of the generating units and the cost functions of the generating units, and formulating the continuous-time valuation metric by aggregating incremental valuation metrics of selected generating units through the operating window; and using the continuous-time valuation metric to determine compensation for each of the generating units, the determined compensation including ramping compensation corresponding to the ramping costs of the generating units.

15. The method of claim 14, wherein the classifications of the generating units throughout the operating window is one of unconstrained, ramp-constrained, and capacity-constrained, and wherein the method further comprises:

selecting a particular generating unit to produce power at a particular time from a set of generating units that includes generating units determined to be in one of the unconstrained classification or the ramp-constrained classification.

16. The method of claim 15, further comprising selecting the particular generating unit to produce power at the particular time based on incremental valuation metrics of the generating units.

17. The method of claim 16, wherein the incremental valuation metrics comprise incremental generation valuation metrics configured to quantify costs associated with changing an amount of power being produced by at least one of the generating units, wherein the particular generating unit is selected as a result of the particular generating unit having a lowest incremental generation metric.

18. The method of claim 16, wherein the incremental valuation metrics comprise an incremental generation cost quantifying costs for changing an amount of power being produced by each generating unit and incremental ramping costs quantifying costs for changing a ramp rate of each generating unit, and wherein selecting the particular generating unit comprises selecting a first generating unit having a lowest incremental ramping cost.

19. The method of claim 18, wherein the first generating unit is selected in response to a variance to a net load forecast for the power system, the method further comprising determining to select the first generation unit rather than a second generation unit having a lower incremental generation cost than an incremental generation cost of the first generating unit based on an estimate of a duration for the variance to a next load.

* * * * *